(12) United States Patent
Li et al.

(10) Patent No.: US 10,812,235 B2
(45) Date of Patent: Oct. 20, 2020

(54) REFERENCE SIGNAL MAPPING METHOD AND DEVICE

(71) Applicant: China Academy of Telecommunications Technology, Beijing (CN)

(72) Inventors: Hui Li, Beijing (CN); Runhua Chen, Beijing (CN); Qiubin Gao, Beijing (CN); Tamrakar Rakesh, Beijing (CN); Qiuping Huang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/337,936

(22) PCT Filed: Sep. 27, 2017

(86) PCT No.: PCT/CN2017/103609
§ 371 (c)(1),
(2) Date: Mar. 29, 2019

(87) PCT Pub. No.: WO2018/059424
PCT Pub. Date: Apr. 5, 2018

(65) Prior Publication Data
US 2019/0229869 A1    Jul. 25, 2019

(30) Foreign Application Priority Data

Sep. 30, 2016  (CN) .......................... 2016 1 0877424
Sep. 26, 2017  (CN) .......................... 2017 1 0882643

(51) Int. Cl.
*H04L 5/00*  (2006.01)
*H04L 27/26*  (2006.01)

(52) U.S. Cl.
CPC .......... *H04L 5/0048* (2013.01); *H04L 5/0051* (2013.01); *H04L 27/261* (2013.01);
(Continued)

(58) Field of Classification Search
CPC ....................................................... H04L 5/0048
See application file for complete search history.

(56) References Cited

U.S. PATENT DOCUMENTS 9,369,898 B2    6/2016  Chun et al.
2013/0114535 A1*  5/2013  Ng .................... H04L 5/0005
                                                 370/329

FOREIGN PATENT DOCUMENTS

CN    102195741 A    9/2011
CN    102595469 A    7/2012
(Continued)

OTHER PUBLICATIONS

Samsung: "Discussions on CDM-8 for NP CSI-RS", 3GPP Draft; R1-166727 Discussions on CDM-8 for NP CSI-RS, 3rd Generation Partnership Project (3GPP), Gothenburg, Sweden; Aug. 22, 2016-Aug. 26, 2016.
(Continued)

*Primary Examiner* — Ayanah S George
(74) *Attorney, Agent, or Firm* — Kilpatrick Townsend & Stockton, LLP

(57) ABSTRACT

Disclosed are a reference signal mapping method and device, used for realizing a CSI-RS mapping of 16 or more ports, so as to realize a CSI-RS transmission of 16 or more ports. The method comprises: according to an N port reference signal pattern, determining that a channel state information reference signal (CSI-RS) is mapped on a resource unit RE, N being an integer greater than 16, wherein, an RE position, having one N port CSI-RS of the N port reference signal pattern mapped thereto, is determined according to an
(Continued)

■ CRS port 1,2
■ CRS port 3,4
▧ DMRS (Release 8) port 5 (optional)
▨ DMRS (Release 9/10)
▦ PDCCH
☐ PDSCH RE position having a CSI-RS in a plurality of groups of 8 port reference signal patterns mapped thereto, each S port in the N port is multiplexed with S code words of 8 code words using an 8-bit orthogonal spreading code, and the 8 port reference signal pattern is an 8 port CSI-RS pattern defined by 3GPP Rel-13; and performing resource mapping on the CSI-RS according to the determined RE.

20 Claims, 6 Drawing Sheets

(52) U.S. Cl.
CPC ...... *H04L 27/2607* (2013.01); *H04L 27/2613* (2013.01); *H04L 5/0026* (2013.01)

(56) References Cited

FOREIGN PATENT DOCUMENTS

| | | | |
|---|---|---|---|
| EP | 3429115 | A1 | 1/2019 |
| TW | I528751 | B | 4/2016 |
| TW | I533650 | B | 5/2016 |
| TW | I544772 | B | 8/2016 |
| TW | I548295 | B | 9/2016 |
| TW | I551076 | B | 9/2016 |
| WO | 2014042422 | A2 | 3/2014 |
| WO | 2014051374 | A1 | 4/2014 |
| WO | 2017166108 | A1 | 10/2017 |

OTHER PUBLICATIONS

Intel Corporation: "Performance comparison of CDM-4 and CDM-8 for CSI-RS", 3GPP Draft; R1-166519 Performance Comparison of CDM-4 and CDM-8 for CSI-RS, 3rd Generation Partnership Project (3GPP), Gothenburg, Sweden; Aug. 22, 2016-Aug. 26, 2016.
"CSI-RS design for {20,24,28,32} ports" 3GPP TSG RAN WG1 Meeting #86, R1-166439, Gothenburg, Sweden, Aug. 22-26, 2016, 4 pages.
NEC,"Discussion on CSI-RS with CDM8", 3GPF TSG RAN WG1 Meeting #86, Gothenburg, Sweden Aug. 22-26, 2016, total 3 pages, R1-166632.
Huawei et al., "CSI-RS pattern design for up to 32 ports", 3GPP TSG RAN WG1 Meeting #86, Göteborg, Sweden, Aug. 22-26, 2016, total 4 pages, R1-167137.
Catt,"CSI-RS enhancement for {20,24,28,32} ports", 3GPP TSG RAN WG1 Meeting #85, Nanjing, China, May 23-27, 2016, total 4 pages, R1-164214.
Nokia et al., "Nonprecoded CSI-RS for Class A CSI Reporting", 3GPP TSG-RAN WG1 Meeting #86, Gothenburg, Sweden, Aug. 22-26, 2016, total 8 pages, R1-166339.

\* cited by examiner

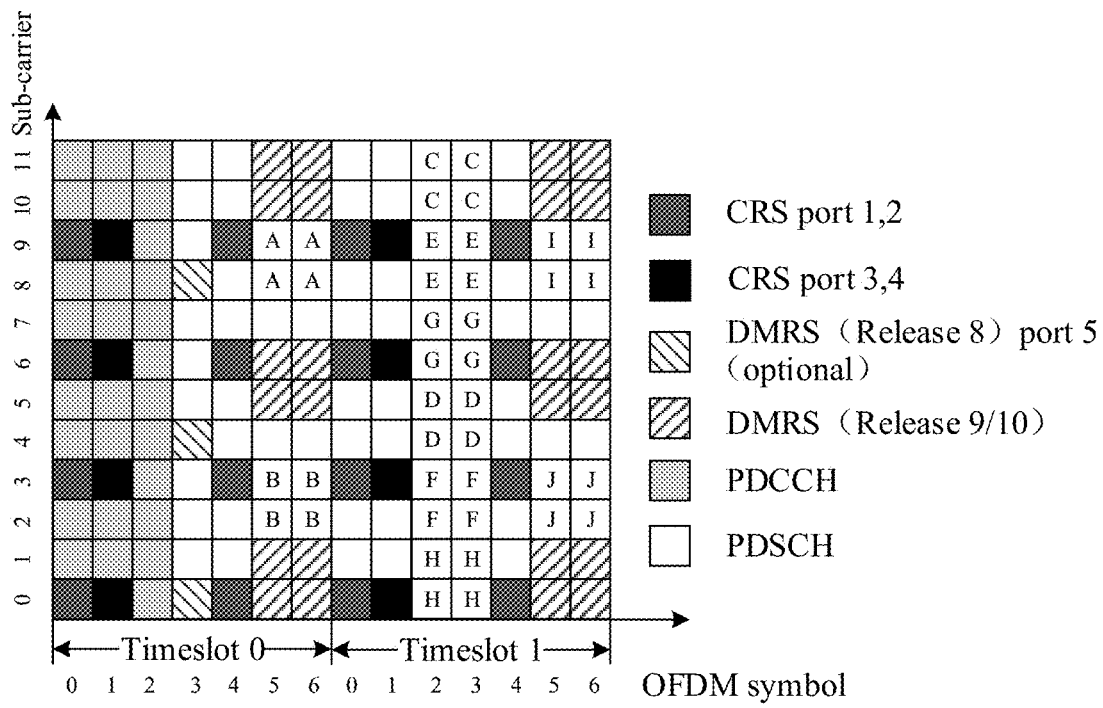

Fig. 2b

```
                                                    ┌─ 301
Determine Resource Elements (REs) to which Channel State Information-Reference
  Signals (CSI-RSs) are mapped, according to an N-port reference signal pattern,
  where N is an integer more than 16, RE positions to which an N-port CSI-RS in the
  N-port reference signal pattern is mapped are determined according to RE positions
     to which a plurality of groups of CSI-RSs in 8-port reference signal pattern are
  mapped, every S ports among the N ports are multiplexed with S codewords among
    eight codewords of an 8-bit orthogonal cover code, and the 8-port reference signal
          pattern is an 8-port CSI-RS pattern defined in the 3GPP Rel-13
```

```
                                                    ┌─ 302
         Map the CSI-RSs to the resources according to the determined REs
```

Fig. 3

REFERENCE SIGNAL MAPPING METHOD AND DEVICE

CROSS-REFERENCES TO RELATED APPLICATIONS

This application is a US National Stage of International Application No. PCT/CN2017/103609, filed Sep. 27, 2017, which claims the benefits of Chinese Patent Application No. 201610877424.5, filed with the Chinese Patent Office on Sep. 30, 2016, and entitled "Method and apparatus for mapping reference signal", and Chinese Patent Application No. 201710882643.7, filed with the Chinese Patent Office on Sep. 26, 2017, and entitled "Method and apparatus for mapping reference signal", both of which are hereby incorporated by reference in their entireties.

FIELD

The present invention relates to the field of wireless communications, and particularly to a method and apparatus for mapping a reference signal.

BACKGROUND

In the downlink in a Long Term Evolution (LTE) system of the Rel-10, a number of reference signals are defined, which generally include a Cell-specific Reference Signal (C-RS), a User Equipment (UE)-specific Reference Signal (UE-RS, also referred to as a Demodulation-Reference Signal (DM-RS)), and a Channel State Information-Reference Signal (CSI-RS), where the CSI-RS is used for downlink channel measurement and estimation.

FIG. 1a, FIG. 1b, and FIG. 1c illustrate reference signal patterns supporting a CSI-RS in the LTE system respectively. The reference signal pattern indicates resource positions of different reference signals, i.e., the positions, in a Physical Resource Block (PRB), of Resource Elements (REs) to which the different reference signals are mapped.

A reference signal is transmitted via each downlink antenna port. The CSI-RS can be configured with 2, 4, or 8 ports, and there are 20 groups of 2-port CSI-RS (a 2-port CSI-RS is mapped onto a group of REs denoted as 0 and 1 as illustrated in FIG. 1a) in a PRB, or 10 groups of 4-port CSI-RS (a 4-port CSI-RS is mapped onto a group of REs denoted as 0 to 3 as illustrated in FIG. 1b), or 5 groups of 8-port CSI-RS (an 8-port CSI-RS is mapped onto a group of REs denoted as 0 to 7 as illustrated in FIG. 1c) in a PRB. The numerals in the boxes in FIG. 1a, FIG. 1b, and FIG. 1c represent port numbers. Every two ports are used in two adjacent REs in a code division multiplexing mode, and as illustrated in FIG. 1a, for example, a group of two REs denoted as 0 and 1 multiplex a port 0 and a port 1 in the code division multiplexing mode using (1 1) and (1 −1). This multiplexing mode is represented as an orthogonal cover code OCC=2.

Hereupon 12-port CSI-RS and 16-port CSI-RS are introduced to the Rel-13, where both the 12-port CSI-RS and the 16-port CSI-RS are generated by aggregating the ports. Also in order to make better use of power, the mode represented as OCC=4 is further introduced in addition to the orthogonal cover code OCC=2 in the Rel-10. In this way, three 4-port CSI-RS's (OOC=2 or OOC=4) are aggregated into one 12-port CSI-RS as illustrated in FIG. 2a, where three 4-port CSI-RSs denoted as A, B, and C constitute one 12-port CSI-RS; and two 8-port CSI-RSs (OOC=2 or OOC=4) are aggregated into one 16-port CSI-RS as illustrated in FIG. 2b, where an 8-port CSI-RS denoted as A and B, and an 8-port CSI-RS denoted as C and D constitute a 16-port CSI-RS. Sections denoted as the same letter in FIG. 2a and FIG. 2b constitute a group of OCC=4, the respective groups are arranged in a Time Division Multiplexing (TDM) mode plus a Frequency Division Multiplexing (FDM) mode, and 4-port CSI-RSs are arranged in four REs in each group.

Transmission of CSI-RS of more antenna ports, e.g., more than 16-port CSI-RS cannot be supported in the existing LTE system.

SUMMARY

Embodiments of the invention provide a method and apparatus for mapping a reference signal to thereby map CSI-RS of more than 16 ports so as to transmit the CSI-RS of more than 16 ports.

Specific technical solutions according to the embodiments of the invention are as follows.

In a first aspect, an embodiment of the invention provides a method for mapping a reference signal, the method including: determining Resource Elements (REs) to which Channel State Information-Reference Signals (CSI-RSs) are mapped, according to an N-port reference signal pattern, wherein N is an integer more than 16, RE positions to which an N-port CSI-RS in the N-port reference signal pattern is mapped are determined according to RE positions to which a plurality of groups of CSI-RSs in 8-port reference signal pattern are mapped, every S ports among N ports are multiplexed with S codewords among eight codewords of an 8-bit orthogonal cover code, and the 8-port reference signal pattern is an 8-port CSI-RS defined in a 3GPP Rel-13; and mapping the CSI-RSs to resources according to the determined REs.

In a possible implementation, N is 20, 24, 28, or 32.

In a possible implementation, when N is 32, 28, 24, or 20, the RE positions to which the N-port CSI-RS is mapped in the N-port reference signal pattern are same as RE positions to which four groups of 8-port CSI-RSs in the 8-port reference signal pattern are mapped, wherein when N is 32, every eight ports among the N ports are multiplexed with the eight codewords of the 8-bit orthogonal cover code, or when N is 28, every seven ports among the N ports are multiplexed with seven codewords of the 8-bit orthogonal cover code, or when N is 24, every six ports among the N ports are multiplexed with six codewords of the 8-bit orthogonal cover code, or when N is 20, every five ports among the N ports are multiplexed with five codewords of the 8-bit orthogonal cover code;

or when N is 24, the RE positions to which the N-port CSI-RS in the N-port reference signal pattern is mapped are the same as RE positions to which three groups of 8-port CSI-RSs in the 8-port reference signal pattern are mapped, wherein every eight ports among the N ports are multiplexed with the eight codewords of the 8-bit orthogonal cover code.

In a possible implementation, in a sub-frame with a normal cyclic prefix, comprising 14 OFDM symbols, the RE positions to which the N-port CSI-RS in the N-port reference signal pattern is mapped are the same as RE positions comprising RE positions to which three groups of 8-port CSI-RSs in a third OFDM symbol and a fourth OFDM symbol in a timeslot 1 in an 8-port reference signal pattern defined by the sub-frame with the normal cyclic prefix are mapped, and RE positions to which one group of 8-port CSI-RS in a sixth OFDM symbol and a seventh OFDM symbol in a timeslot 0 or the timeslot 1 in the 8-port reference signal pattern defined in the sub-frame with the normal cyclic prefix is mapped.

In a possible implementation, in a sub-frame with a normal cyclic prefix, comprising 14 OFDM symbols, the RE positions to which the N-port CSI-RS in the N-port reference signal pattern is mapped are the same as RE positions comprising RE positions to which two groups of 8-port CSI-RSs in a third OFDM symbol and a fourth OFDM symbol in a timeslot 1 in an 8-port reference signal pattern defined in the sub-frame with the normal cyclic prefix are mapped, RE positions to which one group of 8-port CSI-RS in a sixth OFDM symbol and a seventh OFDM symbol in a timeslot 0 in the 8-port reference signal pattern defined in the sub-frame with the normal cyclic prefix is mapped, and RE positions to which one group of 8-port CSI-RS in a sixth OFDM symbol and a seventh OFDM symbol in the timeslot 1 in the 8-port reference signal pattern defined in the sub-frame with the normal cyclic prefix is mapped.

In a possible implementation, when N is 24, and the RE positions to which the N-port CSI-RS is mapped in the N-port reference signal pattern are the same as RE positions to which three groups of 8-port CSI-RSs in the 8-port reference signal pattern are mapped, in a sub-frame with a normal cyclic prefix, comprising 14 OFDM symbols, the RE positions to which the N-port CSI-RS in the N-port reference signal pattern is mapped are the same as RE positions to which any three groups of 8-port CSI-RSs among three groups of 8-port CSI-RSs in a third OFDM symbol and a fourth OFDM symbol in a timeslot 1, one group of 8-port CSI-RSs in a sixth OFDM symbol and a seventh OFDM symbol in the timeslot 1, and one group of 8-port CSI-RSs in a sixth OFDM symbol and a seventh OFDM symbol in a timeslot 0 in an 8-port reference signal pattern defined in the sub-frame with the normal cyclic prefix are mapped.

In a possible implementation, in the sub-frame with the normal cyclic prefix, comprising 14 OFDM symbols, each group of S-port CSI-RS, composed of a group in the sixth OFDM symbol and the seventh OFDM symbol in the timeslot 0 or the timeslot 1, and a group in the third OFDM symbol and the fourth OFDM symbol in the timeslot 1, is multiplexed in eight REs using the 8-bit orthogonal cover code;

wherein the group in the sixth OFDM symbol and the seventh OFDM symbol in the timeslot 0 or the timeslot 1 is one of four groups, each of which occupies two REs respectively, into which one group of 8-port CSI-RS in the sixth OFDM symbol and the seventh OFDM symbol in the timeslot 0 or the timeslot 1 is equally divided according to sub-carrier indices; and the group in the third OFDM symbol and the fourth OFDM symbol in the timeslot 1 is one of four groups, each of which occupies six REs respectively, into which three groups of 8-port CSI-RSs in the third OFDM symbol and the fourth OFDM symbol in the timeslot 1 are equally divided according to sub-carrier indices.

In a possible implementation, in the sub-frame with the normal cyclic prefix, comprising 14 OFDM symbols, each group of S-port CSI-RS, composed of a group in the sixth OFDM symbol and the seventh OFDM symbol in the timeslot 0, a group in the sixth OFDM symbol and the seventh OFDM symbol in the timeslot 1, and a group in the third OFDM symbol and the fourth OFDM symbol in the timeslot 1, is multiplexed in eight REs using the 8-bit orthogonal cover code;

wherein the group in the sixth OFDM symbol and the seventh OFDM symbol in the timeslot 0 is one of four groups, each of which occupies two REs respectively, into which one group of 8-port CSI-RS in the sixth OFDM symbol and the seventh OFDM symbol in the timeslot 0 is equally divided according to sub-carrier indices;

the group in the sixth OFDM symbol and the seventh OFDM symbol in the timeslot 1 is one of four components, each of which occupies two REs respectively, into which one group of 8-port CSI-RS in the sixth OFDM symbol and the seventh OFDM symbol in the timeslot 1 is equally divided according to sub-carrier indices; and the group in the third OFDM symbol and the fourth OFDM symbol in the timeslot 1 is one of four groups, each of which occupies four REs respectively, into which two groups of 8-port CSI-RSs in the third OFDM symbol and the fourth OFDM symbol in the timeslot 1 are equally divided according to sub-carrier indices.

In a possible implementation, in a Downlink Pilot Time Slot (DwPTS) comprising 11 or 12 OFDM symbols, the RE positions to which the N-port CSI-RS in the N-port reference signal pattern is mapped are the same as RE positions comprising RE positions to which three groups of 8-port CSI-RSs in a sixth OFDM symbol and a seventh OFDM symbol in a timeslot 0 in an 8-port reference signal pattern defined in the DwPTS are mapped, and RE positions to which one group of 8-port CSI-RS in a third OFDM symbol and a fourth OFDM symbol in the timeslot 0 or a timeslot 1 in the 8-port reference signal pattern defined in the DwPTS is mapped.

In a possible implementation, in a DwPTS comprising 11 or 12 OFDM symbols, the RE positions to which the N-port CSI-RS in the N-port reference signal pattern is mapped are the same as RE positions comprising RE positions to which two groups of 8-port CSI-RSs in a sixth OFDM symbol and a seventh OFDM symbol in a timeslot 0 in an 8-port reference signal pattern defined in the DwPTS are mapped, RE positions to which one group of 8-port CSI-RS in a third OFDM symbol and a fourth OFDM symbol in the timeslot 0 in the 8-port reference signal pattern defined in the DwPTS is mapped, and RE positions to which one group of 8-port CSI-RS in a third OFDM symbol and a fourth OFDM symbol in a timeslot 1 in the 8-port reference signal pattern defined in the DwPTS is mapped.

In a possible implementation, when N is 24, and the RE positions to which the N-port CSI-RS is mapped in the N-port reference signal pattern are the same as RE positions to which three groups of 8-port CSI-RSs are mapped in the 8-port reference signal pattern, in a DwPTS comprising 11 or 12 OFDM symbols, the RE positions to which the N-port CSI-RS is mapped in the N-port reference signal pattern are the same as RE positions to which any three groups of 8-port CSI-RSs among three groups of 8-port CSI-RSs in a sixth OFDM symbol and a seventh OFDM symbol in a timeslot 0, one group of 8-port CSI-RS in a third OFDM symbol and a fourth OFDM symbol in the timeslot 0, and one group of 8-port CSI-RS in a third OFDM symbol and a fourth OFDM symbol in a timeslot 1 are mapped in an 8-port reference signal pattern defined in the DwPTS is mapped.

In a possible implementation, in the DwPTS comprising 11 or 12 OFDM symbols, each group of S-port CSI-RS, composed of a group in the third OFDM symbol and the fourth OFDM symbol in the timeslot 0 or the timeslot 1, and a group in the sixth OFDM symbol and the seventh OFDM symbol in the timeslot 0, is multiplexed in eight REs using the 8-bit orthogonal cover code;

wherein the group in the third OFDM symbol and the fourth OFDM symbol in the timeslot 0 or the timeslot 1 is one of four groups, each of which occupies two REs respectively, into which one group of 8-port CSI-RS in the third OFDM symbol and the fourth OFDM symbol in the timeslot 0 or the timeslot 1 is equally divided according to sub-carrier indices; and the group in the sixth OFDM symbol and the seventh OFDM symbol in the timeslot 0 is one of four groups, each of which occupies six REs respectively, into which three groups of 8-port CSI-RSs in the sixth OFDM symbol and the seventh OFDM symbol in the timeslot 0 are equally divided according to sub-carrier indices.

In a possible implementation, in the DwPTS comprising 11 or 12 OFDM symbols, each group of S-port CSI-RS, composed of a group in the third OFDM symbol and the fourth OFDM symbol in the timeslot 0, a group in the third OFDM symbol and the fourth OFDM symbol in the timeslot 1, and a group in the sixth OFDM symbol and the seventh OFDM symbol in the timeslot 0, is multiplexed in eight REs using the 8-bit orthogonal cover code;

wherein the group in the third OFDM symbol and the fourth OFDM symbol in the timeslot 0 is one of four groups, each of which occupies two REs respectively, into which one group of 8-port CSI-RS in the third OFDM symbol and the fourth OFDM symbol in the timeslot 0 is equally divided according to sub-carrier indices;

the group in the third OFDM symbol and the fourth OFDM symbol in the timeslot 1 is one of four groups, each of which occupies two REs respectively, into which one group of 8-port CSI-RS in the third OFDM symbol and the fourth OFDM symbol in the timeslot 1 is equally divided according to sub-carrier indices; and the group in the sixth OFDM symbol and the seventh OFDM symbol in the timeslot 0 is one of four groups, each of which occupies four REs respectively, into which two groups of 8-port CSI-RSs in the sixth OFDM symbol and the seventh OFDM symbol in the timeslot 0 are equally divided according to sub-carrier indices.

In a second aspect, an embodiment of the invention provides an apparatus for mapping a reference signal, the apparatus including:

a processing module configured to determine Resource Elements (REs) to which Channel State Information-Reference Signals (CSI-RSs) are mapped, according to an N-port reference signal pattern, wherein N is an integer more than 16, RE positions to which an N-port CSI-RS in the N-port reference signal pattern is mapped are determined according to RE positions to which a plurality of groups of CSI-RSs are mapped in 8-port reference signal pattern, every S ports among N ports are multiplexed with S codewords among eight codewords of an 8-bit orthogonal cover code, and the 8-port reference signal pattern is an 8-port CSI-RS pattern defined in a 3GPP Rel-13; and a mapping module configured to map the CSI-RSs to resources according to the determined REs.

In a possible implementation, N is 20, 24, 28, or 32.

In a possible implementation, when N is 32, 28, 24, or 20, the RE positions to which the N-port CSI-RS in the N-port reference signal pattern is mapped are the same as RE positions to which four groups of 8-port CSI-RSs in the 8-port reference signal pattern are mapped, wherein when N is 32, every eight ports among the N ports are multiplexed with the eight codewords of the 8-bit orthogonal cover code, or when N is 28, every seven ports among the N ports are multiplexed with seven codewords of the 8-bit orthogonal cover code, or when N is 24, every six ports among the N ports are multiplexed with six codewords of the 8-bit orthogonal cover code, or when N is 20, every five ports among the N ports are multiplexed with five codewords of the 8-bit orthogonal cover code;

or when N is 24, the RE positions to which the N-port CSI-RS in the N-port reference signal pattern is mapped are the same as RE positions to which three groups of 8-port CSI-RSs in the 8-port reference signal pattern are mapped, wherein every eight ports among the N ports are multiplexed with the eight codewords of the 8-bit orthogonal cover code.

In a possible implementation, in a sub-frame with a normal cyclic prefix, comprising 14 OFDM symbols, the RE positions to which the N-port CSI-RS in the N-port reference signal pattern is mapped are the same as RE positions comprising RE positions to which three groups of 8-port CSI-RSs in a third OFDM symbol and a fourth OFDM symbol in a timeslot 1 in an 8-port reference signal pattern defined in the sub-frame with the normal cyclic prefix are mapped, and RE positions to which one group of 8-port CSI-RS in a sixth OFDM symbol and a seventh OFDM symbol in a timeslot 0 or the timeslot 1 in the 8-port reference signal pattern defined in the sub-frame with the normal cyclic prefix is mapped.

In a possible implementation, in a sub-frame with a normal cyclic prefix, comprising 14 OFDM symbols, the RE positions to which the N-port CSI-RS in the N-port reference signal pattern is mapped are the same as RE positions comprising RE positions to which two groups of 8-port CSI-RSs in a third OFDM symbol and a fourth OFDM symbol in a timeslot 1 in an 8-port reference signal pattern defined in the sub-frame with the normal cyclic prefix are mapped, RE positions to which one group of 8-port CSI-RS in a sixth OFDM symbol and a seventh OFDM symbol in a timeslot 0 in the 8-port reference signal pattern defined in the sub-frame with the normal cyclic prefix is mapped, and RE positions to which one group of 8-port CSI-RS in a sixth OFDM symbol and a seventh OFDM symbol in the timeslot 1 in the 8-port reference signal pattern defined in the sub-frame with the normal cyclic prefix is mapped.

In a possible implementation, when N is 24, and the RE positions to which the N-port CSI-RS in the N-port reference signal pattern is mapped are the same as RE positions to which three groups of 8-port CSI-RSs in the 8-port reference signal pattern are mapped, in a sub-frame with a normal cyclic prefix, comprising 14 OFDM symbols, the RE positions to which the N-port CSI-RS in the N-port reference signal pattern is mapped are the same as RE positions to which any three groups of 8-port CSI-RSs among three groups of 8-port CSI-RSs in a third OFDM symbol and a fourth OFDM symbol in a timeslot 1, one group of 8-port CSI-RS in a sixth OFDM symbol and a seventh OFDM symbol in the timeslot 1, and one group of 8-port CSI-RS in a sixth OFDM symbol and a seventh OFDM symbol in a timeslot 0 in an 8-port reference signal pattern defined in the sub-frame with the normal cyclic prefix are mapped.

In a possible implementation, in the sub-frame with the normal cyclic prefix, comprising 14 OFDM symbols, each group of S-port CSI-RS, composed of a group in the sixth OFDM symbol and the seventh OFDM symbol in the timeslot 0 or the timeslot 1, and a group in the third OFDM symbol and the fourth OFDM symbol in the timeslot 1, is multiplexed in eight REs using the 8-bit orthogonal cover code;

wherein the group in the sixth OFDM symbol and the seventh OFDM symbol in the timeslot 0 or the timeslot 1 is one of four groups, each of which occupies two REs respectively, into which one group of 8-port CSI-RS in the sixth OFDM symbol and the seventh OFDM symbol in the timeslot 0 or the timeslot 1 is equally divided according to sub-carrier indices; and the group in the third OFDM symbol and the fourth OFDM symbol in the timeslot 1 is one of four groups, each of which occupies six REs respectively, into which three groups of 8-port CSI-RSs in the third OFDM symbol and the fourth OFDM symbol in the timeslot 1 are equally divided according to sub-carrier indices.

In a possible implementation, in the sub-frame with the normal cyclic prefix, comprising 14 OFDM symbols, each group of S-port CSI-RS, composed of a group in the sixth OFDM symbol and the seventh OFDM symbol in the timeslot 0, a group in the sixth OFDM symbol and the seventh OFDM symbol in the timeslot 1, and a group in the third OFDM symbol and the fourth OFDM symbol in the timeslot 1, is multiplexed in eight REs using the 8-bit orthogonal cover code;

wherein the group in the sixth OFDM symbol and the seventh OFDM symbol in the timeslot 0 is one of four groups, each of which occupies two REs respectively, into which one group of 8-port CSI-RS in the sixth OFDM symbol and the seventh OFDM symbol in the timeslot 0 is equally divided according to sub-carrier indices;

the group in the sixth OFDM symbol and the seventh OFDM symbol in the timeslot 1 is one of four groups, each of which occupies two REs respectively, into which one group of 8-port CSI-RS in the sixth OFDM symbol and the seventh OFDM symbol in the timeslot 1 is equally divided according to sub-carrier indices; and the group in the third OFDM symbol and the fourth OFDM symbol in the timeslot 1 is one of four groups, each of which occupies four REs respectively, into which two groups of 8-port CSI-RSs in the third OFDM symbol and the fourth OFDM symbol in the timeslot 1 are equally divided according to sub-carrier indices.

In a possible implementation, in a Downlink Pilot Time Slot (DwPTS) comprising 11 or 12 OFDM symbols, the RE positions to which the N-port CSI-RS in the N-port reference signal pattern is mapped are the same as RE positions comprising RE positions to which three groups of 8-port CSI-RSs in a sixth OFDM symbol and a seventh OFDM symbol in a timeslot 0 in an 8-port reference signal pattern defined in the DwPTS are mapped, and RE positions to which one group of 8-port CSI-RS in a third OFDM symbol and a fourth OFDM symbol in the timeslot 0 or a timeslot 1 in the 8-port reference signal pattern defined in the DwPTS is mapped.

In a possible implementation, in a DwPTS comprising 11 or 12 OFDM symbols, the RE positions to which the N-port CSI-RS in the N-port reference signal pattern is mapped are the same as RE positions comprising RE positions to which two groups of 8-port CSI-RSs in a sixth OFDM symbol and a seventh OFDM symbol in a timeslot 0 in an 8-port reference signal pattern defined in the DwPTS are mapped, RE positions to which one group of 8-port CSI-RS in a third OFDM symbol and a fourth OFDM symbol in the timeslot 0 in the 8-port reference signal pattern defined in the DwPTS is mapped, and RE positions to which one group of 8-port CSI-RS in a third OFDM symbol and a fourth OFDM symbol in a timeslot 1 in the 8-port reference signal pattern defined in the DwPTS is mapped.

In a possible implementation, when N is 24, and the RE positions to which the N-port CSI-RS in the N-port reference signal pattern are the same as RE positions to which three groups of 8-port CSI-RSs in the 8-port reference signal pattern are mapped, in a DwPTS comprising 11 or 12 OFDM symbols, the RE positions to which the N-port CSI-RS in the N-port reference signal pattern is mapped are the same as RE positions to which any three groups of 8-port CSI-RSs among three groups of 8-port CSI-RSs in a sixth OFDM symbol and a seventh OFDM symbol in a timeslot 0, one group of 8-port CSI-RS in a third OFDM symbol and a fourth OFDM symbol in the timeslot 0, and one group of 8-port CSI-RS in a third OFDM symbol and a fourth OFDM symbol in a timeslot 1 in an 8-port reference signal pattern defined in the DwPTS are mapped.

In a possible implementation, in the DwPTS comprising 11 or 12 OFDM symbols, each group of S-port CSI-RS, composed of a group in the third OFDM symbol and the fourth OFDM symbol in the timeslot 0 or the timeslot 1, and a group in the sixth OFDM symbol and the seventh OFDM symbol in the timeslot 0, is multiplexed in eight REs using the 8-bit orthogonal cover code;

wherein the group in the third OFDM symbol and the fourth OFDM symbol in the timeslot 0 or the timeslot 1 is one of four groups, each of which occupies two REs respectively, into which one group of 8-port CSI-RS in the third OFDM symbol and the fourth OFDM symbol in the timeslot 0 or the timeslot 1 is equally divided according to sub-carrier indices; and the group in the sixth OFDM symbol and the seventh OFDM symbol in the timeslot 0 is one of four groups, each of which occupies six REs respectively, into which three groups of 8-port CSI-RSs in the sixth OFDM symbol and the seventh OFDM symbol in the timeslot 0 are equally divided according to sub-carrier indices.

In a possible implementation, in the DwPTS comprising 11 or 12 OFDM symbols, each group of S-port CSI-RS, composed of a group in the third OFDM symbol and the fourth OFDM symbol in the timeslot 0, a group in the third OFDM symbol and the fourth OFDM symbol in the timeslot 1, and a group in the sixth OFDM symbol and the seventh OFDM symbol in the timeslot 0, is multiplexed in eight REs using the 8-bit orthogonal cover code;

wherein the group in the third OFDM symbol and the fourth OFDM symbol in the timeslot 0 is one of four groups, each of which occupies two REs respectively, into which one group of 8-port CSI-RS in the third OFDM symbol and the fourth OFDM symbol in the timeslot 0 is equally divided according to sub-carrier indices;

the group in the third OFDM symbol and the fourth OFDM symbol in the timeslot 1 is one of four groups, each of which occupies two REs respectively, into which one group of 8-port CSI-RS in the third OFDM symbol and the fourth OFDM symbol in the timeslot 1 is equally divided according to sub-carrier indices; and the group in the sixth OFDM symbol and the seventh OFDM symbol in the timeslot 0 is one of four groups, each of which occupies four REs respectively, into which two groups of 8-port CSI-RSs in the group in the sixth OFDM symbol and the seventh OFDM symbol in the timeslot 0 are equally divided according to sub-carrier indices.

In a third aspect, an embodiment of the invention provides a base station including: a processor, a memory, a transceiver, and a bus interface, wherein:

the processor is configured to read and execute program in the memory:

to determine Resource Elements (REs) to which Channel State Information-Reference Signals (CSI-RSs) are mapped, according to an N-port reference signal pattern, wherein N is an integer more than 16, RE positions to which an N-port CSI-RS in the N-port reference signal pattern is mapped are determined according to RE position to which a plurality of groups of CSI-RSs in 8-port reference signal pattern are mapped, every S ports among N ports are multiplexed with S codewords among eight codewords of an 8-bit orthogonal cover code, and the 8-port reference signal pattern is an 8-port CSI-RS pattern defined in a 3GPP Rel-13; and to map the CSI-RSs to resources according to the determined REs.

In the embodiments above of the invention, an N-port reference signal pattern is obtained according to an 8-port CSI-RS pattern defined in the 3GPP Rel-13, and in order to map a reference signal, RE positions to which CSI-RSs are mapped are determined according to the N-port reference signal pattern, and the CSI-RSs are mapped to the resources according to the RE positions. Since N is an integer more than 16, the CSI-RS of more than 16 ports can be mapped and further transmitted.

BRIEF DESCRIPTION OF THE DRAWINGS

FIG. 1a, FIG. 1b, and FIG. 1c are 2-port, 4-port, and 8-port reference signal patterns respectively in the prior art;

FIG. 2a and FIG. 2b are 12-port and 16-port reference signal patterns respectively in the existing LTE system of the Rel-13;

FIG. 3 is a schematic flow chart of a method for mapping a reference signal according to an embodiment of the invention in details;

DETAILED DESCRIPTION OF THE INVENTION

Figure 1A:
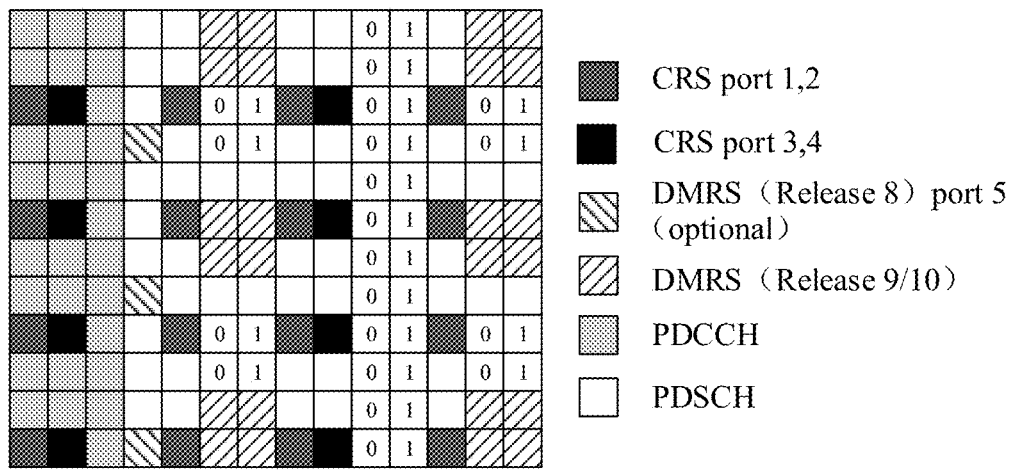

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Long Term Evolution-Advanced (LTE-A) system, a Universal Mobile Telecommunication System (UMTS) system, etc.

It shall be further appreciated in the embodiments of the invention, a User Equipment (UE) includes but will not be limited to a Mobile Station (MS), a mobile terminal, a mobile telephone, a handset, a portable equipment, etc., and the user equipment can communicate with one or more core networks through a Radio Access Network (RAN). For example, the user equipment can be a mobile phone (or referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal and the remaining components of the access network, where the remaining components of the access network can include an Internet Protocol (IP) network. The base station can further coordinate attribute management on the air interface, and for example, the base station can be a Base Transceiver Station (BTS) in a GSM or CDMA system, or can be a Node B in a WCDMA system, or can be an evolved base station (Node B or eNB or e-Node B) in an LTE system, although the embodiments of the invention will not be limited thereto.

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Transmission of 1-port, 2-port, 4-port, 8-port, 12-port, and 16-port CSI-RSs are supported in the existing LTE standard, but transmission of CSI-RSs of more than 16 ports including 20, 24, 28, 32, etc., ports are not supported. In view of this, the embodiments of the invention provide a method and apparatus for mapping a reference signal so as to support transmission of more than 16 port CSI-RS including 20-port, 24-port, 28-port, 32-port, etc., port CSI-RS.

The embodiments of the invention will be described below in details with reference to the drawings.

A reference signal is transmitted on each downlink antenna port. The antenna port refers to a logic port for transmitting a signal, and it can correspond to one or more real physical antenna. The antenna port is defined from the perspective of a receiver, that is, when the receiver needs to distinguish resources from each other in space, then a plurality of antenna ports need to be defined. For a UE, a reference signal, corresponding to some antenna port, received by the UE, defines the corresponding antenna port, although the reference signal is formed by combining signals transmitted over a plurality of physical antennas.

FIG. 3 illustrates a flow chart of a method for mapping a reference signal according to an embodiment of the invention in details, where the flow can be performed by a base station specifically as follows.

The step 301 is to determine Resource Elements (REs) to which Channel State Information-Reference Signals (CSI-RSs) are mapped, according to an N-port reference signal pattern, where N is an integer more than 16, RE positions to which an N-port CSI-RS in the N-port reference signal pattern are mapped are determined according to RE positions to which a plurality of groups of CSI-RSs in 8-port reference signal pattern are mapped, every S ports among the N ports are multiplexed with S codewords among eight codewords of an 8-bit orthogonal cover code, and the 8-port reference signal pattern is an 8-port CSI-RS pattern defined in the 3GPP Rel-13.

The step 302 is to map the CSI-RSs to the resources according to the determined REs.

Specifically N is 20, 24, 28, or 32.

With the flow above, in the case that the base station is configured with N antenna ports, the base station can configure a UE with an N-port CSI-RS. The UE measures a channel on the configured CSI-RS ports, and feeds back channel information.

An N-port (N=20, 24, 28, or 32) reference signal pattern is obtained according to an 8-port CSI-RS pattern defined in the 3GPP Rel-13. When mapping the reference signal, RE positions to which the CSI-RSs are mapped are determined according to the N-port reference signal pattern, and the CSI-RSs are mapped to the resources according to the RE positions, so that the N-port CSI-RS is mapped and further transmitted.

Taking N=20, 24, 28, or 32 as an example, the following description will be given of the following several specific instances in which RE positions to which an N-port CSI-RS is mapped are determined according to an 8-port CSI-RS pattern defined in the 3GPP Rel-13 in the flow above.

In a first instance, for 32 ports, RE positions to which one 32-port CSI-RS in a 32-port reference signal pattern is mapped are the same as RE positions to which four groups of 8-port CSI-RSs in an 8-port reference signal pattern are mapped. Every eight ports among 32 ports are multiplexed with eight codewords of an 8-bit orthogonal cover code.

In a second instance, for 28 ports, RE positions to which one 28-port CSI-RS in a 28-port reference signal pattern is mapped are the same as RE positions to which four groups of 8-port CSI-RSs in an 8-port reference signal pattern are mapped. Every seven ports among 28 ports are multiplexed with seven codewords of an 8-bit orthogonal cover code.

In a third instance, for 24 ports, RE positions to which one 24-port CSI-RS in a 24-port reference signal pattern is mapped are the same as RE positions to which four groups of 8-port CSI-RSs in an 8-port reference signal pattern are mapped. Every six ports among 24 ports are multiplexed with six codewords of an 8-bit orthogonal cover code.

In a fourth instance, for 20 ports, RE positions to which one 20-port CSI-RS in a 20-port reference signal pattern is mapped are the same as RE positions to which four groups of 8-port CSI-RSs in an 8-port reference signal pattern are mapped. Every five ports among 20 ports are multiplexed with five codewords of an 8-bit orthogonal cover code.

In a fifth instance, for 24 ports, RE positions to which a 24-port CSI-RS in a 24-port reference signal pattern is mapped are the same as RE positions to which three groups of 8-port CSI-RSs in an 8-port reference signal pattern are mapped. Every eight ports among 24 ports are multiplexed with eight codewords of an 8-bit orthogonal cover code.

In the first to fourth instances, the RE positions to which the CSI-RS in an 8-port reference signal pattern is mapped may further vary with the number of symbols in a sub-frame, specifically in the following instances.

In an instance a, in a sub-frame with a normal cyclic prefix, including 14 orthogonal Frequency Division Multiplexing (OFDM) symbols, RE positions to which an N-port CSI-RS in the N-port reference signal pattern is mapped are the same as RE positions including RE positions to which three groups of 8-port CSI-RS in the third OFDM symbol and the fourth OFDM symbol in a timeslot 1 in an 8-port reference signal pattern defined in the sub-frame with the normal cyclic prefix are mapped, and RE positions to which one group of 8-port CSI-RS in the sixth OFDM symbol and the seventh OFDM symbol in a timeslot 0 or the timeslot 1 in the 8-port reference signal pattern defined in the sub-frame with the normal cyclic prefix is mapped.

In the instance a, in a sub-frame with a normal cyclic prefix, including 14 OFDM symbols, each group of S-port CSI-RS, composed of a group in the sixth OFDM symbol and the seventh OFDM symbol in the timeslot 0 or the timeslot 1, and a group in the third OFDM symbol and the fourth OFDM symbol in the timeslot 1, is multiplexed in eight REs using an 8-bit orthogonal cover code.

In the instance a, the group in the sixth OFDM symbol and the seventh OFDM symbol in the timeslot 0 or the timeslot 1 is one of four groups, each of which occupies two REs respectively, into which one group of 8-port CSI-RS in the sixth OFDM symbol and the seventh OFDM symbol in the timeslot 0 or the timeslot 1 are equally divided according to sub-carrier indices, and the group in the third OFDM symbol and the fourth OFDM symbol in the timeslot 1 is one of four groups, each of which occupies six REs respectively, into which three groups of 8-port CSI-RSs in the third OFDM symbol and the fourth OFDM symbol in the timeslot 1 are equally divided according to sub-carrier indices.

In the instance a, when N is 32, S is 8; when N is 28, S is 7; when N is 24, S is 6; and when N is 20, S is 5.

In an instance b, in a sub-frame with a normal cyclic prefix, including 14 OFDM symbols, RE positions to which an N-port CSI-RS in the N-port reference signal pattern is mapped are the same as RE positions including RE positions to which two groups of 8-port CSI-RS in the third OFDM symbol and the fourth OFDM symbol in a timeslot 1 in an 8-port reference signal pattern defined in the sub-frame with the normal cyclic prefix are mapped, RE positions to which one group of 8-port CSI-RS in the sixth OFDM symbol and the seventh OFDM symbol in a timeslot 0 in the 8-port reference signal pattern defined in the sub-frame with the normal cyclic prefix is mapped, and RE positions to which one group of 8-port CSI-RS in the sixth OFDM symbol and the seventh OFDM symbol in the timeslot 1 in the 8-port reference signal pattern defined in the sub-frame with the normal cyclic prefix is mapped.

In the instance b, in a sub-frame with a normal cyclic prefix, including 14 OFDM symbols, each group of S-port CSI-RS, composed of a group in the sixth OFDM symbol and the seventh OFDM symbol in the timeslot 0, a group in the sixth OFDM symbol and the seventh OFDM symbol in the timeslot 1, and a group in the third OFDM symbol and the fourth OFDM symbol in the timeslot 1, is multiplexed in eight REs using the 8-bit orthogonal cover code.

In the instance b, the group in the sixth OFDM symbol and the seventh OFDM symbol in the timeslot 0 is one of four groups, each of which occupies two REs respectively, into which one group of 8-port CSI-RS in the sixth OFDM symbol and the seventh OFDM symbol in the timeslot 0 is equally divided according to sub-carrier indices.

The group in the sixth OFDM symbol and the seventh OFDM symbol in the timeslot 1 is one of four groups, each of which occupies two REs respectively, into which one group of 8-port CSI-RS in the sixth OFDM symbol and the seventh OFDM symbol in the timeslot 1 is equally divided according to sub-carrier indices.

The group in the third OFDM symbol and the fourth OFDM symbol in the timeslot 1 is one of four groups, each of which occupies four REs respectively, into which two groups of 8-port CSI-RSs in the third OFDM symbol and the fourth OFDM symbol in the timeslot 1 are equally divided according to sub-carrier indices.

In the instance b, when N is 32, S is 8; when N is 28, S is 7; when N is 24, S is 6; and when N is 20, S is 5.

In an instance c, in a Downlink Pilot Time Slot (DwPTS) including 11 or 12 OFDM symbols, RE positions to which an N-port CSI-RS in the N-port reference signal pattern is mapped are the same as RE positions including RE positions to which three groups of 8-port CSI-RSs in the sixth OFDM symbol and the seventh OFDM symbol in a timeslot 0 in an 8-port reference signal pattern defined in the DwPTS are mapped, and RE positions to which one group of 8-port CSI-RS in the third OFDM symbol and the fourth OFDM symbol in the timeslot 0 or a timeslot 1 in the 8-port reference signal pattern defined in the DwPTS is mapped.

In the instance c, in a DwPTS including 11 or 12 OFDM symbols, each group of S-port CSI-RS, composed of a group in the third OFDM symbol and the fourth OFDM symbol in the timeslot 0 or the timeslot 1, and a group in the sixth OFDM symbol and the seventh OFDM symbol in the timeslot 0, is multiplexed in eight REs using the 8-bit orthogonal cover code.

In the instance c, the group in the third OFDM symbol and the fourth OFDM symbol in the timeslot 0 or the timeslot 1 is one of four groups, each of which occupies two REs respectively, into which one group of 8-port CSI-RS in the third OFDM symbol and the fourth OFDM symbol in the timeslot 0 or the timeslot 1 is equally divided according to sub-carrier indices.

The group in the sixth OFDM symbol and the seventh OFDM symbol in the timeslot 0 is one of four groups, each of which occupies six REs respectively, into which three groups of 8-port CSI-RS in the sixth OFDM symbol and the seventh OFDM symbol in the timeslot 0 are equally divided according to sub-carrier indices.

In the instance c, when N is 32, S is 8; when N is 28, S is 7; when N is 24, S is 6; and when N is 20, S is 5.

In an instance d, in a DwPTS including 11 or 12 OFDM symbols, RE positions to which an N-port CSI-RS in the N-port reference signal pattern is mapped are the same as RE positions including RE positions to which two groups of 8-port CSI-RSs in the sixth OFDM symbol and the seventh OFDM symbol in a timeslot 0 in an 8-port reference signal pattern defined in the DwPTS are mapped, RE positions to which one group of 8-port CSI-RS in the third OFDM symbol and the fourth OFDM symbol in the timeslot 0 in the 8-port reference signal pattern defined in the DwPTS is mapped, and RE positions to which one group of 8-port CSI-RS in the third OFDM symbol and the fourth OFDM symbol in a timeslot 1 in the 8-port reference signal pattern defined in the DwPTS is mapped.

In the instance d, in a DwPTS including 11 or 12 OFDM symbols, each group of S-port CSI-RS, composed of a group in the third OFDM symbol and the fourth OFDM symbol in the timeslot 0, a group in the third OFDM symbol and the fourth OFDM symbol in the timeslot 1, and a group in the sixth OFDM symbol and the seventh OFDM symbol in the timeslot 0, is multiplexed in eight REs using the 8-bit orthogonal cover code.

In the instance d, the group in the third OFDM symbol and the fourth OFDM symbol in the timeslot 0 is one of four groups, each of which occupies two REs respectively, into which one group of 8-port CSI-RS in the third OFDM symbol and the fourth OFDM symbol in the timeslot 0 is equally divided according to sub-carrier indices; and the group in the third OFDM symbol and the fourth OFDM symbol in the timeslot 1 is one of four groups, each of which occupies two REs respectively, into which one group of 8-port CSI-RS in the third OFDM symbol and the fourth OFDM symbol in the timeslot 1 is equally divided according to sub-carrier indices.

The group in the sixth OFDM symbol and the seventh OFDM symbol in the timeslot 0 is one of four groups, each of which occupies four REs respectively, into which two groups of 8-port CSI-RSs in the sixth OFDM symbol and the seventh OFDM symbol in the timeslot 0 are equally divided according to sub-carrier indices.

In the instance d, when N is 32, S is 8; when N is 28, S is 7; when N is 24, S is 6; and when N is 20, S is 5.

For the instance 5, symbol positions of REs to which CSI-RS in an 8-port reference signal pattern is mapped may further vary with the number of symbols in a sub-frame, specifically in the following instances.

In an instance e, in a sub-frame with a normal cyclic prefix, including 14 OFDM symbols, RE positions to which an N-port CSI-RS in the N-port reference signal pattern is mapped are the same as RE positions to which any three groups of 8-port CSI-RSs among three groups of 8-port CSI-RSs in the third OFDM symbol and the fourth OFDM symbol in a timeslot 1, one group of 8-port CSI-RS in the sixth OFDM symbol and the seventh OFDM symbol in the timeslot 1, and one group of 8-port CSI-RS in the sixth OFDM symbol and the seventh OFDM symbol in a timeslot 0 in an 8-port reference signal pattern defined in the sub-frame with the normal cyclic prefix are mapped, where N is 24.

In an instance f, in a DwPTS including 11 or 12 OFDM symbols, RE positions to which an N-port CSI-RS in the N-port reference signal pattern is mapped are the same as RE positions to which any three groups of 8-port CSI-RSs among three groups of 8-port CSI-RSs in the sixth OFDM symbol and the seventh OFDM symbol in a timeslot 0, one group of 8-port CSI-RS in the third OFDM symbol and the fourth OFDM symbol in the timeslot 0, and one group of 8-port CSI-RS in the third OFDM symbol and the fourth OFDM symbol in a timeslot 1 in an 8-port reference signal pattern defined in the DwPTS are mapped, where N is 24.

Figure 2A:
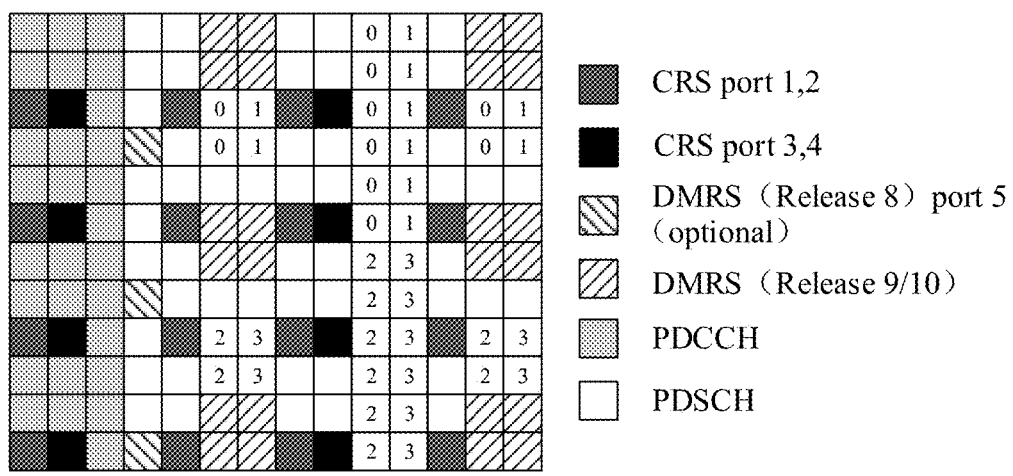
Figure 1C:
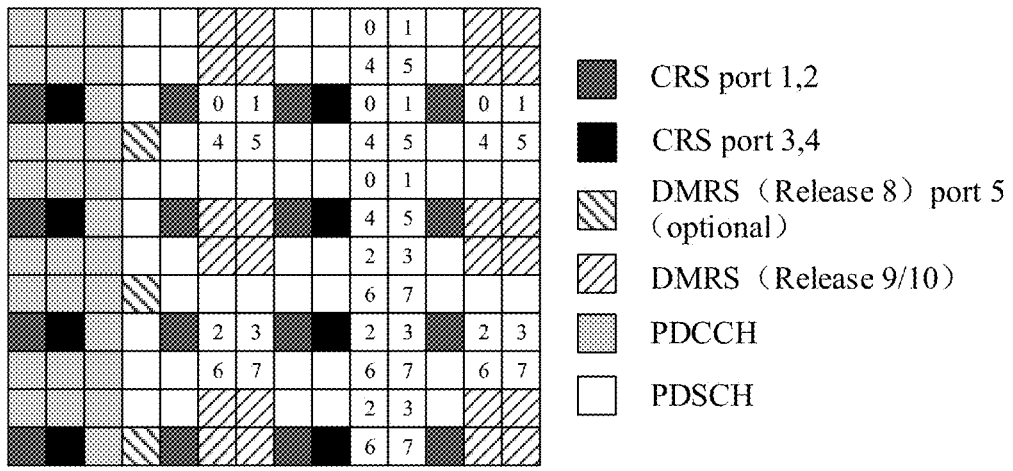
Figure 2A:
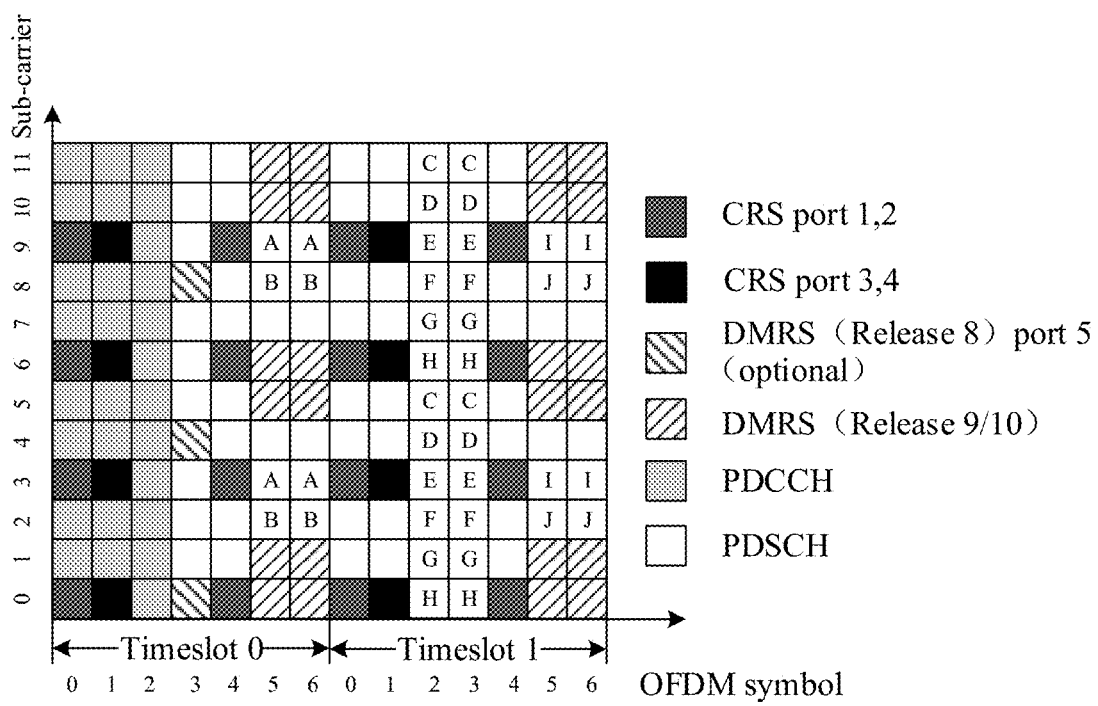

For a 32-port CSI-RS, if the ports of OCC=2 in FIG. 1a, FIG. 1b, or FIG. 1c are aggregated directly, for example, 16 groups of 2-port CSI-RSs are aggregated, 8 groups of 4-port CSI-RSs are aggregated, or 4 groups of 8-port CSI-RSs are aggregated, then power of the respective ports may be underused so that pilot power is only one fourth of data power; and if the ports of OCC=4 in FIG. 2a and FIG. 2b are aggregated directly, for example, 8 groups of 4-port CSI-RSs are aggregated, or 4 groups of 8-port CSI-RSs are aggregated, then there may be different pilot power in the OFDM symbol 5 and the OFDM symbol 6 from pilot power in the OFDM symbol 2 and the OFDM symbol 3 (the pilot power in the OFDM symbol 5 and the OFDM symbol 6 is one third of data power, and the pilot power in the OFDM symbol 2 and the OFDM symbol 3 is one second of data power), thus hindering pilot coverage. Alike the same problem of different pilot power may exist for 18-port, 20-port, 24-port, or 28-port pilots. In the embodiment of the invention, the ports are aggregated using an 8-bit orthogonal cover code (i.e., OCC=8) to thereby transmit CSI-RS at the same power, and make full use of pilot power with extended OCC=8, without increasing any additional pilot resources and lowering any pilot density.

The following description will be given taking a 32-port CSI-RS and a 24-port CSI-RS respectively as an example.

(1) A 32-port reference signal pattern

In a 32-port reference signal pattern, a group of 32-port CSI-RS is mapped to 32 RE positions, which are the same as 32 RE positions to which four groups of 8-port CSI-RSs in an 8-port reference signal pattern are mapped, and each group of 8-port CSI-RS is multiplexed in eight REs using an 8-bit orthogonal cover code.

Figure 4:
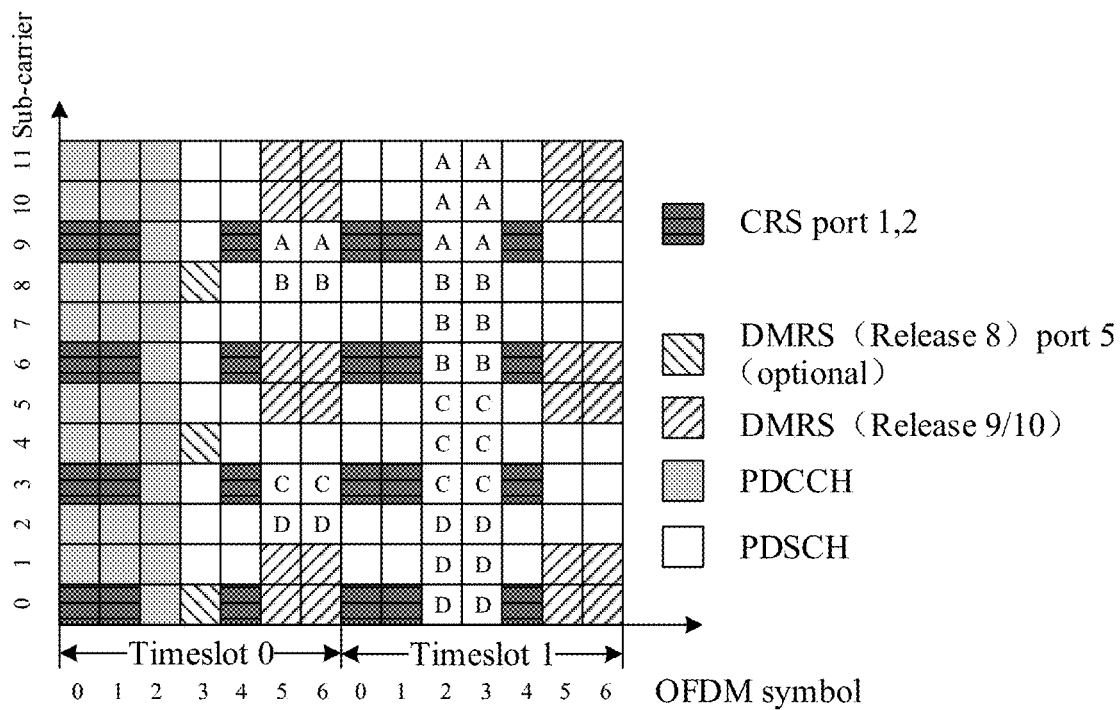
FIG. 4 is a schematic diagram of a 32-port reference signal pattern according to an embodiment of the invention.

FIG. 4 illustrates a 32-port reference signal pattern, where each box represents an RE. The box corresponding to each of REs to which a 32-port CSI-RS is mapped is denoted as a letter. The 32-port reference signal pattern illustrated in FIG. 4 includes four groups of 8-port CSI-RSs, and REs to which the four groups of 8-port CSI-RSs are mapped are denoted respectively as A to D.

Specifically the four groups of 8-port CSI-RSs illustrated in FIG. 4 include three groups of 8-port CSI-RSs in the OFDM symbol 2 and the OFDM symbol 3 in a timeslot 1, and one group of 8-port CSI-RS in the OFDM symbol 5 and the OFDM symbol 6 in a timeslot 0 (or the timeslot 1). When multiplexing with OCC=8, one group of 8-port CSI-RS in the OFDM symbol 5 and the OFDM symbol 6 in the timeslot 0 or the timeslot 1 is equally divided into four groups according to sub-carrier indices (each group occupies two REs), and three groups of 8-port CSI-RSs in the OFDM symbol 2 and the OFDM symbol 3 in the timeslot 1 are equally divided into four groups according to sub-carrier indices (each group occupies six REs). In this way, a group of OCC=8 includes one of the groups in the OFDM symbol 5 and the OFDM symbol 6 in the timeslot 0 or the timeslot 1, and one of the groups in the OFDM symbol 2 and the OFDM symbol 3 in the timeslot 1. Sections denoted as the same letter represents a group of OCC=8. Each 8-port CSI-RS composed of a group of OCC=8 is multiplexed in eight REs using an orthogonal cover code with the length of 8.

Figure 5:
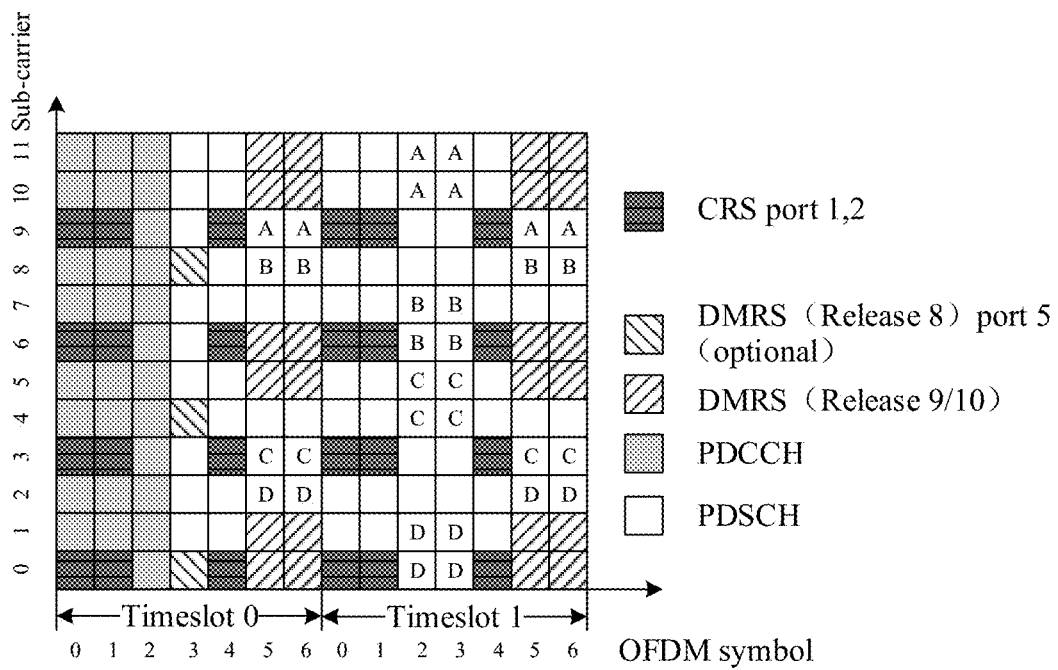
FIG. 5 is a schematic diagram of another 32-port reference signal pattern according to an embodiment of the invention.

FIG. 5 illustrates another 32-port reference signal pattern, where each box represents an RE. The box corresponding to each of REs to which a 32-port CSI-RS is mapped is denoted as a letter. The 32-port reference signal pattern illustrated in FIG. 5 includes four groups of 8-port CSI-RSs, and REs to which the four groups of 8-port CSI-RSs are mapped are denoted respectively as A to D, where the positions of the REs denoted as A are the same as RE positions to which a group of 8-port CSI-RS is mapped in an 8-port reference signal pattern, and alike the positions of the REs denoted as B, C, and D are the same as RE positions to which a group of 8-port CSI-RS is mapped in the 8-port reference signal pattern, respectively.

Specifically the four groups of 8-port CSI-RSs illustrated in FIG. 5 include two groups of 8-port CSI-RSs in the OFDM symbol 2 and the OFDM symbol 3 in a timeslot 1, one group of 8-port CSI-RS in the OFDM symbol 5 and the OFDM symbol 6 in a timeslot 0, and one group of 8-port CSI-RS in the OFDM symbol 5 and the OFDM symbol 6 in the timeslot 1. When multiplexing with OCC=8, one group of 8-port CSI-RS in the OFDM symbol 5 and the OFDM symbol 6 in the timeslot 0 and the timeslot 1 is equally divided into four groups (each group occupies two REs) according to sub-carrier indices, and two groups of 8-port CSI-RSs in the OFDM symbol 2 and the OFDM symbol 3 in the timeslot 1 are equally divided into four groups (each group occupies four REs) according to sub-carrier indices. In this way, a group with OCC=8 includes one of the groups in the OFDM symbol 5 and the OFDM symbol 6 in the timeslot 0, one of the groups in the OFDM symbol 5 and the OFDM symbol 6 in the timeslot 1, and one of the groups in the OFDM symbol 2 and the OFDM symbol 3 in the timeslot 1. Sections denoted as the same letter represents a group with OCC=8. Each 8-port CSI-RS, composed of a group with OCC=8, is multiplexed in eight REs using an orthogonal cover code with the length of 8.

It shall be noted that FIG. 4 and FIG. 5 only illustrate a possible 32-port reference signal pattern respectively, but other 32-port reference signal patterns can be further obtained according to the 32-port reference signal pattern above, and a repeated description thereof will be omitted here.

Figure 6:
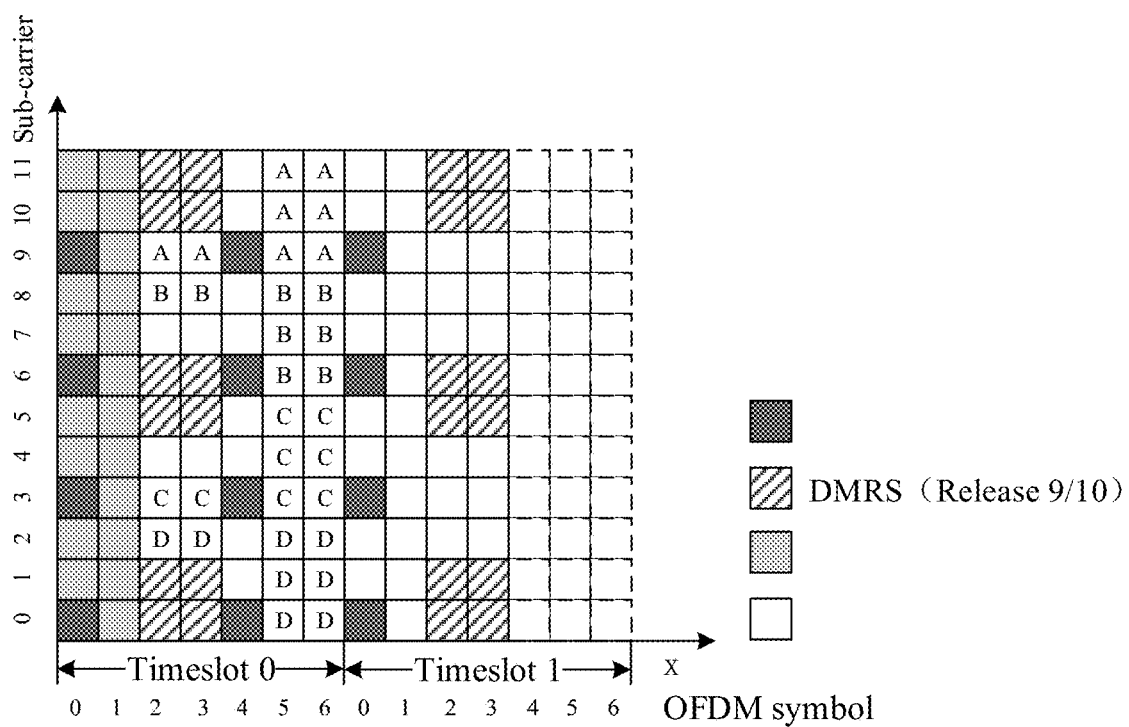
FIG. 6 is a schematic diagram of another 32-port reference signal pattern according to an embodiment of the invention.

In the embodiment of the invention, a 32-port reference signal pattern in a DWPTS area of a TDD sub-frame can be further obtained based upon the same principle except for a time shift. FIG. 6 illustrates an example of a 32-port reference signal pattern in a DWPTS area of a TDD sub-frame.

CSI-RS corresponding to the same letters in FIG. 4 to FIG. 6 constitute a group of OCC=8, and are arranged in a multiplexing mode using a group of 8-bit orthogonal cover codes. For example, they can be multiplexed as depicted in Table 1.

TABLE 1

| OCC index | Orthogonal cover code (OCC = 8) for each group of 8-port REs | | | | | | | |
|---|---|---|---|---|---|---|---|---|
| 0 | 1 | 1 | 1 | 1 | 1 | 1 | 1 | 1 |
| 1 | 1 | 1 | 1 | 1 | −1 | −1 | −1 | −1 |
| 2 | 1 | 1 | −1 | −1 | −1 | −1 | 1 | 1 |
| 3 | 1 | −1 | 1 | −1 | 1 | −1 | 1 | −1 |
| 4 | −1 | −1 | 1 | 1 | −1 | −1 | 1 | 1 |
| 5 | −1 | 1 | 1 | −1 | −1 | 1 | 1 | −1 |
| 6 | 1 | −1 | −1 | 1 | −1 | 1 | 1 | −1 |
| 7 | 1 | −1 | 1 | −1 | −1 | 1 | −1 | 1 |

(2) A 24-port reference signal pattern

In a 24-port reference signal pattern, 24 RE positions to which a group of 24-port CSI-RS is mapped are the same as 24 RE positions to which three groups of 8-port CSI-RS in an 8-port reference signal pattern are mapped.

A PRB can include five groups of 8-port CSI-RSs, and in the embodiment of the invention, any three of the groups of 8-port CSI-RSs can be selected to constitute a 24-port CSI-RS.

Figure 7:
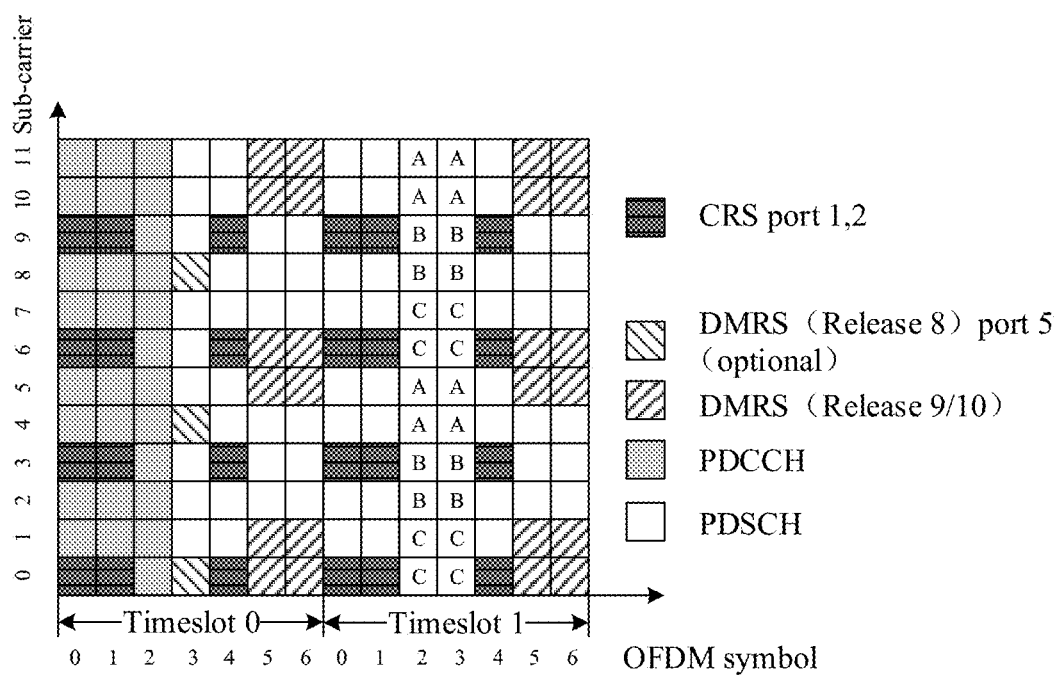
FIG. 7 is a schematic diagram of a 24-port reference signal pattern according to an embodiment of the invention.

FIG. 7 illustrates a 24-port reference signal pattern, where each box represents an RE. The box corresponding to each of REs to which a 24-port CSI-RS is mapped is denoted as a letter. The 24-port reference signal pattern illustrated in FIG. 7 includes three groups of 8-port CSI-RSs, and REs to which the three groups of 8-port CSI-RSs are mapped are denoted respectively as A to C, where the positions of the REs denoted as A are the same as RE positions to which a group of 8-port CSI-RS in an 8-port reference signal pattern is mapped, and alike the positions of the REs denoted as B and C are the same as RE positions to which a group of 8-port CSI-RS in the 8-port reference signal pattern is mapped, respectively.

Specifically the three groups of 8-port CSI-RSs illustrated in FIG. 7 include three groups of 8-port CSI-RSs in the OFDM symbol 2 and the OFDM symbol in a timeslot 1. Sections denoted as the same letter represents a group of OCC=8. Each eight CSI-RS ports is code division multiplexed in eight REs in a group of OCC=8 using an orthogonal cover code with the length of 8.

It shall be noted that the aggregation mode, and the group definition of OCC=8, in the 32-port reference signal pattern can apply to 28-port, 24-port, and 20-port reference signal patterns except that: for 28 ports, every seven CSI-RS ports multiplex eight REs in a group of OCC=8 in a code division multiplexing mode using an orthogonal cover code with the length of 8; for 24 ports, every six CSI-RS ports are code division multiplexed in eight REs in a group of OCC=8 using an orthogonal cover code with the length of 8; and for 20 ports, every five CSI-RS ports are code division multiplex in eight REs in a group of OCC=8 using an orthogonal cover code with the length of 8.

Figure 8:
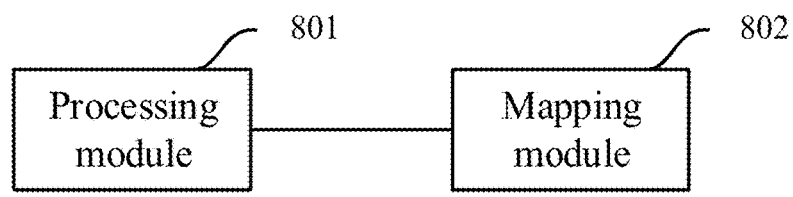
FIG. 8 is a schematic structural diagram of an apparatus for mapping a reference signal according to an embodiment of the invention.

Based upon the same inventive idea, an embodiment of the invention provides an apparatus for mapping a reference signal, and reference can be made to the description of the method for a particular implementation of the apparatus, so a repeated description thereof will be omitted here; and as illustrated in FIG. 8, the apparatus generally includes the followings.

A processing module 801 is configured to determine Resource Elements (REs) to which Channel State Information-Reference Signals (CSI-RSs) are mapped, according to an N-port reference signal pattern, where N is an integer more than 16, RE positions to which an N-port CSI-RS in the N-port reference signal pattern is mapped are determined according to RE positions to which a plurality of groups of CSI-RSs in 8-port reference signal patterns are mapped, every S ports among the N ports are multiplexed with S codewords among eight codewords of an 8-bit orthogonal cover code, and the 8-port reference signal pattern is an 8-port CSI-RS pattern defined in the 3GPP Rel-13.

A mapping module 802 is configured to map the CSI-RSs to the resources according to the REs determined by the processing module.

In a possible implementation, N is 20, 24, 28, or 32.

In a possible implementation, when N is 32, 28, 24, or 20, RE positions to which an N-port CSI-RS in an N-port reference signal pattern is mapped are the same as RE positions to which four groups of 8-port CSI-RSs in an 8-port reference signal pattern are mapped, where when N is 32, every eight ports among the N ports are multiplexed with eight codewords of an 8-bit orthogonal cover code, or when N is 28, every seven ports among the N ports are multiplexed with seven codewords of an 8-bit orthogonal cover code, or when N is 24, every six ports among the N ports are multiplexed with six codewords of an 8-bit orthogonal cover code in a multiplexing mode, or when N is 20, every five ports among the N ports are multiplexed with five codewords of an 8-bit orthogonal cover code.

Or when N is 24, RE positions to which an N-port CSI-RS in an N-port reference signal pattern is mapped are the same as RE positions to which three groups of 8-port CSI-RSs in an 8-port reference signal pattern are mapped, where every eight ports among the N ports are multiplexed with eight codewords of an 8-bit orthogonal cover code.

In a possible implementation, in a sub-frame with a normal cyclic prefix, including 14 OFDM symbols, RE positions to which an N-port CSI-RS in the N-port reference signal pattern is mapped are the same as RE positions including RE positions to which three groups of 8-port CSI-RSs in the third OFDM symbol and the fourth OFDM symbol in a timeslot 1 in an 8-port reference signal pattern defined in the sub-frame with the normal cyclic prefix are mapped, and RE positions to which one group of 8-port CSI-RS in the sixth OFDM symbol and the seventh OFDM symbol in a timeslot 0 or the timeslot 1 in the 8-port reference signal pattern defined in the sub-frame with the normal cyclic prefix are mapped.

In a possible implementation, in a sub-frame with a normal cyclic prefix, including 14 OFDM symbols, RE positions to which an N-port CSI-RS in the N-port reference signal pattern is mapped are the same as RE positions including RE positions to which two groups of 8-port CSI-RSs in the third OFDM symbol and the fourth OFDM symbol in a timeslot 1 in an 8-port reference signal pattern defined in the sub-frame with the normal cyclic prefix are mapped, RE positions to which one group of 8-port CSI-RS in the sixth OFDM symbol and the seventh OFDM symbol in a timeslot 0 in the 8-port reference signal pattern defined in the sub-frame with the normal cyclic prefix is mapped, and RE positions to which one group of 8-port CSI-RS in the sixth OFDM symbol and the seventh OFDM symbol in the timeslot 1 in the 8-port reference signal pattern defined in the sub-frame with the normal cyclic prefix is mapped.

In a possible implementation, when N is 24, and RE positions to which an N-port CSI-RS in an N-port reference signal pattern is mapped are the same as RE positions to which three groups of 8-port CSI-RSs in an 8-port reference signal pattern are mapped.

In a sub-frame with a normal cyclic prefix, including 14 OFDM symbols, RE positions to which an N-port CSI-RS in the N-port reference signal pattern is mapped are the same as RE positions to which any three groups of 8-port CSI-RSs among three groups of 8-port CSI-RSs in the third OFDM symbol and the fourth OFDM symbol in a timeslot 1 in an 8-port reference signal pattern defined in the sub-frame with the normal cyclic prefix, one group of 8-port CSI-RS in the sixth OFDM symbol and the seventh OFDM symbol in the timeslot 1, and one group of 8-port CSI-RS in the sixth OFDM symbol and the seventh OFDM symbol in a timeslot 0 are mapped.

In a possible implementation, in a sub-frame with a normal cyclic prefix, including 14 OFDM symbols, each group of S-port CSI-RS, composed of a group in the sixth OFDM symbol and the seventh OFDM symbol in the timeslot 0 or the timeslot 1, and a group in the third OFDM symbol and the fourth OFDM symbol in the timeslot 1, is multiplexed in eight REs using the 8-bit orthogonal cover code.

Where the group in the sixth OFDM symbol and the seventh OFDM symbol in the timeslot 0 or the timeslot 1 is one of four groups, each of which occupies two REs respectively, into which one group of 8-port CSI-RS in the sixth OFDM symbol and the seventh OFDM symbol in the timeslot 0 or the timeslot 1 is equally divided according to sub-carrier indices.

The group in the third OFDM symbol and the fourth OFDM symbol in the timeslot 1 is one of four groups, each of which occupies six REs respectively, into which three groups of 8-port CSI-RSs in the third OFDM symbol and the fourth OFDM symbol in the timeslot 1 are equally divided according to sub-carrier indices.

In a possible implementation, in a sub-frame with a normal cyclic prefix, including 14 OFDM symbols, each group of S-port CSI-RS, composed of a group in the sixth OFDM symbol and the seventh OFDM symbol in the timeslot 0, a group in the sixth OFDM symbol and the seventh OFDM symbol in the timeslot 1, and a group in the third OFDM symbol and the fourth OFDM symbol in the timeslot 1, is multiplexed in eight REs using the 8-bit orthogonal cover code.

Where the group in the sixth OFDM symbol and the seventh OFDM symbol in the timeslot 0 is one of four groups, each of which occupies two REs respectively, into which one group of 8-port CSI-RS in the sixth OFDM symbol and the seventh OFDM symbol in the timeslot 0 is equally divided according to sub-carrier indices.

The group in the sixth OFDM symbol and the seventh OFDM symbol in the timeslot 1 is one of four groups, each of which occupies two REs respectively, into which one group of 8-port CSI-RS in the sixth OFDM symbol and the seventh OFDM symbol in the timeslot 1 is equally divided according to sub-carrier indices.

The group in the third OFDM symbol and the fourth OFDM symbol in the timeslot 1 is one of four groups, each of which occupies four REs respectively, into which two groups of 8-port CSI-RSs in the third OFDM symbol and the fourth OFDM symbol in the timeslot 1 are equally divided according to sub-carrier indices.

In a possible implementation, in a DwPTS including 11 or 12 OFDM symbols, RE positions to which an N-port CSI-RS in the N-port reference signal pattern is mapped are the same as RE positions including RE positions to which three groups of 8-port CSI-RSs in the sixth OFDM symbol and the seventh OFDM symbol in a timeslot 0 in an 8-port reference signal pattern defined in the DwPTS are mapped, and RE positions to which one group of 8-port CSI-RS in the third OFDM symbol and the fourth OFDM symbol in the timeslot 0 or a timeslot 1 in the 8-port reference signal pattern defined in the DwPTS are mapped.

In a possible implementation, in a DwPTS including 11 or 12 OFDM symbols, RE positions to which an N-port CSI-RS in the N-port reference signal pattern is mapped are the same as RE positions including RE positions to which two groups of 8-port CSI-RSs in the sixth OFDM symbol and the seventh OFDM symbol in a timeslot 0 in an 8-port reference signal pattern defined in the DwPTS are mapped, RE positions to which one group of 8-port CSI-RS in the third OFDM symbol and the fourth OFDM symbol in the timeslot 0 in the 8-port reference signal pattern defined in the DwPTS is mapped, and RE positions to which one group of 8-port CSI-RS in the third OFDM symbol and the fourth OFDM symbol in a timeslot 1 in the 8-port reference signal pattern defined in the DwPTS is mapped.

In a possible implementation, when N is 24, and RE positions to which an N-port CSI-RS in an N-port reference signal pattern is mapped are the same as RE positions to which three groups of 8-port CSI-RSs in an 8-port reference signal pattern are mapped, In a DwPTS including 11 or 12 OFDM symbols, RE positions to which an N-port CSI-RS in the N-port reference signal pattern is mapped are the same as RE positions to which any three groups of 8-port CSI-RSs among three groups of 8-port CSI-RSs in the sixth OFDM symbol and the seventh OFDM symbol in a timeslot 0 in an 8-port reference signal pattern defined in the DwPTS, one group of 8-port CSI-RS in the third OFDM symbol and the fourth OFDM symbol in the timeslot 0, and one group of 8-port CSI-RS in the third OFDM symbol and the fourth OFDM symbol in a timeslot 1 are mapped.

In a possible implementation, in a DwPTS including 11 or 12 OFDM symbols, each group of S-port CSI-RS, composed of a group in the third OFDM symbol and the fourth OFDM symbol in the timeslot 0 or the timeslot 1, and a group in the sixth OFDM symbol and the seventh OFDM symbol in the timeslot 0, is multiplexed in eight REs using the 8-bit orthogonal cover code.

The group in the third OFDM symbol and the fourth OFDM symbol in the timeslot 0 or the timeslot 1 is one of four groups, each of which occupies two REs respectively, into which one group of 8-port CSI-RS in the third OFDM symbol and the fourth OFDM symbol in the timeslot 0 or the timeslot 1 is equally divided according to sub-carrier indices.

The group in the sixth OFDM symbol and the seventh OFDM symbol in the timeslot 0 is one of four groups, each of which occupies six REs respectively, into which three groups of 8-port CSI-RSs in the sixth OFDM symbol and the seventh OFDM symbol in the timeslot 0 are equally divided according to sub-carrier indices.

In a possible implementation, in a DwPTS including 11 or 12 OFDM symbols, each group of S-port CSI-RS, composed of a group in the third OFDM symbol and the fourth OFDM symbol in the timeslot 0, a group in the third OFDM symbol and the fourth OFDM symbol in the timeslot 1, and a group in the sixth OFDM symbol and the seventh OFDM symbol in the timeslot 0, is multiplexed in eight REs using the 8-bit orthogonal cover code.

The group in the third OFDM symbol and the fourth OFDM symbol in the timeslot 0 is one of four groups, each of which occupies two REs respectively, into which one group of 8-port CSI-RS in the third OFDM symbol and the fourth OFDM symbol in the timeslot 0 is equally divided according to sub-carrier indices.

The group in the third OFDM symbol and the fourth OFDM symbol in the timeslot 1 is one of four groups, each of which occupies two REs respectively, into which one group of 8-port CSI-RS in the third OFDM symbol and the fourth OFDM symbol in the timeslot 1 is equally divided according to sub-carrier indices.

The group in the sixth OFDM symbol and the seventh OFDM symbol in the timeslot 0 is one of four groups, each of which occupies four REs respectively, into which two groups of 8-port CSI-RSs in the component in the sixth OFDM symbol and the seventh OFDM symbol in the timeslot 0 are equally divided according to sub-carrier indices.

Based upon the same inventive idea, an embodiment of the invention further provides a base station, which can perform the flow above of mapping a reference signal.

Figure 9:
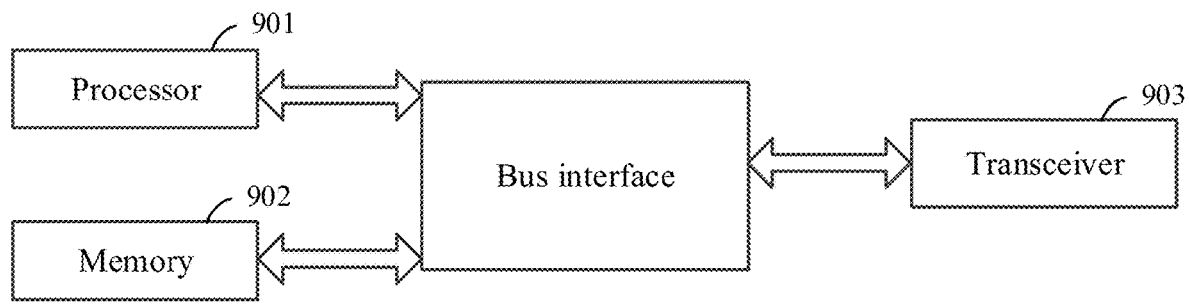
FIG. 9 is a schematic structural diagram of a base station according to an embodiment of the invention.

FIG. 9 illustrates a schematic structural diagram of a base station according to an embodiment of the invention, where the base station can include: a processor 901, a memory 902, a transceiver 903, and a bus interface.

The processor is responsible for managing a bus architecture and performing normal processes, the memory 902 can store data for use by the processor 901 in performing operations, and the transceiver 903 is configured to transmit and receive data under the control of the processor 901.

The bus architecture can include any number of interconnecting buses and bridges to particularly link together various circuits including one or more processors represented by the processor 901, and one or more memories represented by the memory 902. The bus architecture can further link together various other circuits, e.g., a peripheral device, a manostat, a power management circuit, etc., all of which are well known in the art, so a further description thereof will be omitted in this context. The bus interface serves as an interface. The transceiver 903 can be a number of elements, e.g., a transmitter and a receiver, which are units for communication with various other devices over a transmission medium. The processor 901 is responsible for managing the bus architecture and performing normal processes, and the memory 902 can store data for use by the processor 901 in performing the operations.

The flow according to the embodiment of the invention can be applied to the processor 901, or performed by the processor 901. In an implementation, the respective steps in the flow of transmitting data can be performed by integrated logic circuits in hardware, or instructions in software, in the processor 901. The processor 901 can be a general-purpose processor, a digital signal processor, an application specific integrated circuit, a field programmable gate array, or another programmable logic device, discrete gate, transistor logic device, or discrete hardware component. The respective methods, steps, and logic block diagrams disclosed in the embodiments of the invention can be implemented or performed. The general-purpose processor can be a microprocessor, or can be any conventional processor, etc. The steps in the method according to the embodiment of the invention can be performed directly by a hardware processor, or performed by a combination of hardware and software modules in the processor.

The software module can be located in a random memory, a flash memory, a read-only memory, a programmable read-only memory, an electrically erasable and programmable memory, a register, or another storage medium known in the art. The storage medium is located in the memory 902, and the processor 901 reads the information in the memory 902, and performs the steps in the control-plane processing method in combination with the hardware thereof.

Specifically the processor 901 is configured to read and execute the program in the memory 902: to determine Resource Elements (REs) to which Channel State Information-Reference Signals (CSI-RSs) are mapped, according to an N-port reference signal pattern, where N is an integer more than 16, RE positions to which an N-port CSI-RS in the N-port reference signal pattern is mapped are determined according to RE position to which a plurality of groups of CSI-RSs in 8-port reference signal patterns are mapped, every S ports among the N ports are multiplexed with S codewords among eight codewords of an 8-bit orthogonal cover code, and the 8-port reference signal pattern is an 8-port CSI-RS pattern defined in the 3GPP Rel-13; and to map the CSI-RSs to the resources according to the REs determined by the processing module.

In one embodiment, N is 20, 24, 28, or 32.

Here reference can be made to the embodiment above for how the processor 901 determines the REs to which the Channel State Information-Reference Signals (CSI-RSs) are mapped, according to the N-port reference signal pattern, and the 8-port CSI-RS pattern defined in the 3GPP Rel-13, so a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for mapping a reference signal, comprising:
    determining Resource Elements (REs) to which Channel State Information-Reference Signals (CSI-RSs) are mapped, according to an N-port reference signal pattern, wherein N is an integer more than 16, RE positions to which an N-port CSI-RS in the N-port reference signal pattern is mapped are determined according to RE positions to which a plurality of groups of CSI-RSs in 8-port reference signal pattern are mapped, every S ports among N ports are multiplexed with S codewords among eight codewords of an 8-bit orthogonal cover code, and the 8-port reference signal pattern is an 8-port CSI-RS pattern defined in a 3GPP Rel-13; and
    mapping the CSI-RSs to resources according to the determined REs.

2. The method according to claim 1, wherein N is 20, 24, 28, or 32.

3. The method according to claim 1, wherein when N is 32, 28, 24, or 20, the RE positions to which the N-port CSI-RS in the N-port reference signal pattern is mapped are same as RE positions to which four groups of 8-port CSI-RSs in the 8-port reference signal pattern are mapped, wherein when N is 32, every eight ports among the N ports are multiplexed with the eight codewords of the 8-bit orthogonal cover code, or when N is 28, every seven ports among the N ports are multiplexed with seven codewords of the 8-bit orthogonal cover code, or when N is 24, every six ports among the N ports are multiplexed with six codewords of the 8-bit orthogonal cover code, or when N is 20, every five ports among the N ports are multiplexed with five codewords of the 8-bit orthogonal cover code;

or when N is 24, the RE positions to which the N-port CSI-RS in the N-port reference signal pattern is mapped are the same as RE positions to which three groups of 8-port CSI-RSs in the 8-port reference signal pattern are mapped, wherein every eight ports among the N ports are multiplexed with the eight codewords of the 8-bit orthogonal cover code.

4. The method according to claim 3, wherein in a sub-frame with a normal cyclic prefix, comprising 14 OFDM symbols, the RE positions to which the N-port CSI-RS in the N-port reference signal pattern is mapped are the same as RE positions comprising RE positions to which three groups of 8-port CSI-RSs in a third OFDM symbol and a fourth OFDM symbol in a timeslot 1 in an 8-port reference signal pattern defined by the sub-frame with the normal cyclic prefix are mapped, and RE positions to which one group of 8-port CSI-RS in a sixth OFDM symbol and a seventh OFDM symbol in a timeslot 0 or the timeslot 1 in the 8-port reference signal pattern defined in the sub-frame with the normal cyclic prefix is mapped.

5. The method according to claim 3, wherein in a sub-frame with a normal cyclic prefix, comprising 14 OFDM symbols, the RE positions to which the N-port CSI-RS in the N-port reference signal pattern is mapped are the same as RE positions comprising RE positions to which two groups of 8-port CSI-RSs in a third OFDM symbol and a fourth OFDM symbol in a timeslot 1 in an 8-port reference signal pattern defined in the sub-frame with the normal cyclic prefix are mapped, RE positions to which one group of 8-port CSI-RS in a sixth OFDM symbol and a seventh OFDM symbol in a timeslot 0 in the 8-port reference signal pattern defined in the sub-frame with the normal cyclic prefix is mapped, and RE positions to which one group of 8-port CSI-RS in a sixth OFDM symbol and a seventh OFDM symbol in the timeslot 1 in the 8-port reference signal pattern defined in the sub-frame with the normal cyclic prefix is mapped.

6. The method according to claim 3, wherein when N is 24, and the RE positions to which the N-port CSI-RS in the N-port reference signal pattern is mapped are the same as RE positions to which three groups of 8-port CSI-RSs in the 8-port reference signal pattern are mapped, in a sub-frame with a normal cyclic prefix, comprising 14 OFDM symbols, the RE positions to which the N-port CSI-RS in the N-port reference signal pattern is mapped are the same as RE positions to which any three groups of 8-port CSI-RSs among three groups of 8-port CSI-RSs in a third OFDM symbol and a fourth OFDM symbol in a timeslot 1, one group of 8-port CSI-RSs in a sixth OFDM symbol and a seventh OFDM symbol in the timeslot 1, and one group of 8-port CSI-RSs in a sixth OFDM symbol and a seventh OFDM symbol in a timeslot 0 in an 8-port reference signal pattern defined in the sub-frame with the normal cyclic prefix are mapped.

7. The method according to claim 4, wherein in the sub-frame with the normal cyclic prefix, comprising 14 OFDM symbols, each group of S-port CSI-RS, composed of a group in the sixth OFDM symbol and the seventh OFDM symbol in the timeslot 0 or the timeslot 1, and a group in the third OFDM symbol and the fourth OFDM symbol in the timeslot 1, is multiplexed in eight REs using the 8-bit orthogonal cover code;

wherein the group in the sixth OFDM symbol and the seventh OFDM symbol in the timeslot 0 or the timeslot 1 is one of four groups, each of which occupies two REs respectively, into which one group of 8-port CSI-RS in the sixth OFDM symbol and the seventh OFDM symbol in the timeslot 0 or the timeslot 1 is equally divided according to sub-carrier indices; and the group in the third OFDM symbol and the fourth OFDM symbol in the timeslot 1 is one of four groups, each of which occupies six REs respectively, into which three groups of 8-port CSI-RSs in the third OFDM symbol and the fourth OFDM symbol in the timeslot 1 are equally divided according to sub-carrier indices.

8. The method according to claim 5, wherein in the sub-frame with the normal cyclic prefix, comprising 14 OFDM symbols, each group of S-port CSI-RS, composed of a group in the sixth OFDM symbol and the seventh OFDM symbol in the timeslot 0, a group in the sixth OFDM symbol and the seventh OFDM symbol in the timeslot 1, and a group in the third OFDM symbol and the fourth OFDM symbol in the timeslot 1, is multiplexed in eight REs using the 8-bit orthogonal cover code wherein the group in the sixth OFDM symbol and the seventh OFDM symbol in the timeslot 0 is one of four groups, each of which occupies two REs respectively, into which one group of 8-port CSI-RS in the sixth OFDM symbol and the seventh OFDM symbol in the timeslot 0 is equally divided according to sub-carrier indices;

the group in the sixth OFDM symbol and the seventh OFDM symbol in the timeslot 1 is one of four components, each of which occupies two REs respectively, into which one group of 8-port CSI-RS in the sixth OFDM symbol and the seventh OFDM symbol in the timeslot 1 is equally divided according to sub-carrier indices; and the group in the third OFDM symbol and the fourth OFDM symbol in the timeslot 1 is one of four groups, each of which occupies four REs respectively, into which two groups of 8-port CSI-RSs in the third OFDM symbol and the fourth OFDM symbol in the timeslot 1 are equally divided according to sub-carrier indices.

9. The method according to claim 3, wherein in a Downlink Pilot Time Slot (DwPTS) comprising 11 or 12 OFDM symbols, the RE positions to which the N-port CSI-RS is mapped in the N-port reference signal pattern are the same as RE positions comprising RE positions to which three groups of 8-port CSI-RSs in a sixth OFDM symbol and a seventh OFDM symbol in a timeslot 0 in an 8-port reference signal pattern defined in the DwPTS are mapped, and RE positions to which one group of 8-port CSI-RS in a third OFDM symbol and a fourth OFDM symbol in the timeslot 0 or a timeslot 1 in the 8-port reference signal pattern defined in the DwPTS is mapped.

10. The method according to claim 3, wherein in a DwPTS comprising 11 or 12 OFDM symbols, the RE positions to which the N-port CSI-RS in the N-port reference signal pattern is mapped are the same as RE positions comprising RE positions to which two groups of 8-port CSI-RSs in a sixth OFDM symbol and a seventh OFDM symbol in a timeslot 0 in an 8-port reference signal pattern defined in the DwPTS are mapped, RE positions to which one group of 8-port CSI-RS in a third OFDM symbol and a fourth OFDM symbol in the timeslot 0 in the 8-port reference signal pattern defined in the DwPTS is mapped, and RE positions to which one group of 8-port CSI-RS in a third OFDM symbol and a fourth OFDM symbol in a timeslot 1 in the 8-port reference signal pattern defined in the DwPTS is mapped.

11. The method according to claim 3, wherein when N is 24, and the RE positions to which the N-port CSI-RS in the N-port reference signal pattern is mapped are the same as RE positions to which three groups of 8-port CSI-RSs in the 8-port reference signal pattern are mapped,
in a DwPTS comprising 11 or 12 OFDM symbols, the RE positions to which the N-port CSI-RS in the N-port reference signal pattern is mapped are the same as RE positions to which any three groups of 8-port CSI-RSs among three groups of 8-port CSI-RSs in a sixth OFDM symbol and a seventh OFDM symbol in a timeslot 0, one group of 8-port CSI-RS in a third OFDM symbol and a fourth OFDM symbol in the timeslot 0, and one group of 8-port CSI-RS in a third OFDM symbol and a fourth OFDM symbol in a timeslot 1 in an 8-port reference signal pattern defined in the DwPTS are mapped.

12. The method according to claim 9, wherein in the DwPTS comprising 11 or 12 OFDM symbols, each group of S-port CSI-RS is arranged in eight REs using the 8-bit orthogonal cover code in a multiplexing mode in a group in the third OFDM symbol and the fourth OFDM symbol in the timeslot 0 or the timeslot 1, and a group in the sixth OFDM symbol and the seventh OFDM symbol in the timeslot 0;
wherein the group in the third OFDM symbol and the fourth OFDM symbol in the timeslot 0 or the timeslot 1 is one of four groups, each of which occupies two REs respectively, into which one group of 8-port CSI-RS in the third OFDM symbol and the fourth OFDM symbol in the timeslot 0 or the timeslot 1 is equally divided per sub-carrier; and
the group in the sixth OFDM symbol and the seventh OFDM symbol in the timeslot 0 is one of four groups, each of which occupies six REs respectively, into which three groups of 8-port CSI-RSs in the sixth OFDM symbol and the seventh OFDM symbol in the timeslot 0 are equally divided per sub-carrier.

13. The method according to claim 10, wherein in the DwPTS comprising 11 or 12 OFDM symbols, each group of S-port CSI-RS, composed of a group in the third OFDM symbol and the fourth OFDM symbol in the timeslot 0, a group in the third OFDM symbol and the fourth OFDM symbol in the timeslot 1, and a group in the sixth OFDM symbol and the seventh OFDM symbol in the timeslot 0, is multiplexed in eight REs using the 8-bit orthogonal cover code;
wherein the group in the third OFDM symbol and the fourth OFDM symbol in the timeslot 0 is one of four groups, each of which occupies two REs respectively, into which one group of 8-port CSI-RS in the third OFDM symbol and the fourth OFDM symbol in the timeslot 0 is equally divided according to sub-carrier indices;
the group in the third OFDM symbol and the fourth OFDM symbol in the timeslot 1 is one of four groups, each of which occupies two REs respectively, into which one group of 8-port CSI-RS in the third OFDM symbol and the fourth OFDM symbol in the timeslot 1 is equally divided according to sub-carrier indices; and
the group in the sixth OFDM symbol and the seventh OFDM symbol in the timeslot 0 is one of four groups, each of which occupies four REs respectively, into which two groups of 8-port CSI-RSs in the sixth OFDM symbol and the seventh OFDM symbol in the timeslot 0 are equally divided according to sub-carrier indices.

14. An apparatus for mapping a reference signal, comprising: a processor and a memory, wherein:
the memory is configured to store a program; and
the processor is configured to read and execute the program in the memory to cause the processor to:
determine Resource Elements (REs) to which Channel State Information-Reference Signals (CSI-RSs) are mapped, according to an N-port reference signal pattern, wherein N is an integer more than 16, RE positions to which an N-port CSI-RS is mapped in the N-port reference signal pattern are determined according to RE positions to which a plurality of groups of CSI-RSs in 8-port reference signal pattern are mapped, every S ports among N ports are multiplexed with S codewords among eight codewords of an 8-bit orthogonal cover code, and the 8-port reference signal pattern is an 8-port CSI-RS pattern defined in a 3GPP Rel-13; and
map the CSI-RSs to resources according to the determined REs.

15. The apparatus according to claim 14, wherein N is 20, 24, 28, or 32.

16. The apparatus according to claim 14, wherein when N is 32, 28, 24, or 20, the RE positions to which the N-port CSI-RS in the N-port reference signal pattern is mapped are the same as RE positions to which four groups of 8-port CSI-RSs are mapped in the 8-port reference signal pattern, wherein when N is 32, every eight ports among the N ports are multiplexed with the eight codewords of the 8-bit orthogonal cover code, or when N is 28, every seven ports among the N ports are multiplexed with seven codewords of the 8-bit orthogonal cover code, or when N is 24, every six ports among the N ports are multiplexed with six codewords of the 8-bit orthogonal cover code, or when N is 20, every five ports among the N ports are multiplexed with five codewords of the 8-bit orthogonal cover code;
or
when N is 24, the RE positions to which the N-port CSI-RS in the N-port reference signal pattern is mapped are the same as RE positions to which three groups of 8-port CSI-RSs in the 8-port reference signal pattern are mapped, wherein every eight ports among the N ports are multiplexed with the eight codewords of the 8-bit orthogonal cover code.

17. The apparatus according to claim 16, wherein in a sub-frame with a normal cyclic prefix, comprising 14 OFDM symbols, the RE positions to which the N-port CSI-RS in the N-port reference signal pattern is mapped are the same as RE positions comprising RE positions to which three groups of 8-port CSI-RSs in a third OFDM symbol and a fourth OFDM symbol in a timeslot 1 in an 8-port reference signal pattern defined in the sub-frame with the normal cyclic prefix are mapped, and RE positions to which one group of 8-port CSI-RS in a sixth OFDM symbol and a seventh OFDM symbol in a timeslot 0 or the timeslot 1 in the 8-port reference signal pattern defined in the sub-frame with the normal cyclic prefix is mapped.

18. The apparatus according to claim 16, wherein in a sub-frame with a normal cyclic prefix, comprising 14 OFDM symbols, the RE positions to which the N-port CSI-RS in the N-port reference signal pattern is mapped are the same as RE positions comprising RE positions to which two groups of 8-port CSI-RSs in a third OFDM symbol and a fourth OFDM symbol in a timeslot 1 in an 8-port reference signal pattern defined in the sub-frame with the normal cyclic prefix are mapped, RE positions to which one group of 8-port CSI-RS in a sixth OFDM symbol and a seventh OFDM symbol in a timeslot 0 in the 8-port reference signal pattern defined in the sub-frame with the normal cyclic prefix is mapped, and RE positions to which one group of 8-port CSI-RS in a sixth OFDM symbol and a seventh OFDM symbol in the timeslot 1 in the 8-port reference signal pattern defined in the sub-frame with the normal cyclic prefix is mapped.

19. The apparatus according to claim 16, wherein when N is 24, and the RE positions to which the N-port CSI-RS in the N-port reference signal pattern is mapped are the same as RE positions to which three groups of 8-port CSI-RSs in the 8-port reference signal pattern are mapped, in a sub-frame with a normal cyclic prefix, comprising 14 OFDM symbols, the RE positions to which the N-port CSI-RS in the N-port reference signal pattern is mapped are the same as RE positions to which any three groups of 8-port CSI-RSs among three groups of 8-port CSI-RSs in a third OFDM symbol and a fourth OFDM symbol in a timeslot 1, one group of 8-port CSI-RS in a sixth OFDM symbol and a seventh OFDM symbol in the timeslot 1, and one group of 8-port CSI-RS in a sixth OFDM symbol and a seventh OFDM symbol in a timeslot 0 in an 8-port reference signal pattern defined in the sub-frame with the normal cyclic prefix are mapped.

20. The apparatus according to claim 17, wherein in the sub-frame with the normal cyclic prefix, comprising 14 OFDM symbols, each group of S-port CSI-RS, composed of in a group in the sixth OFDM symbol and the seventh OFDM symbol in the timeslot 0 or the timeslot 1, and a group in the third OFDM symbol and the fourth OFDM symbol in the timeslot 1, is multiplexed in eight REs using an 8-bit orthogonal cover code;

wherein the group in the sixth OFDM symbol and the seventh OFDM symbol in the timeslot 0 or the timeslot 1 is one of four groups, each of which occupies two REs respectively, into which one group of 8-port CSI-RS in the sixth OFDM symbol and the seventh OFDM symbol in the timeslot 0 or the timeslot 1 is equally divided according to sub-carrier indices; and the group in the third OFDM symbol and the fourth OFDM symbol in the timeslot 1 is one of four groups, each of which occupies six REs respectively, into which three groups of 8-port CSI-RSs in the third OFDM symbol and the fourth OFDM symbol in the timeslot 1 are equally divided according to sub-carrier indices.

* * * * *